(12) United States Patent
Badeau et al.

(10) Patent No.: US 10,786,767 B2
(45) Date of Patent: *Sep. 29, 2020

(54) FILTER APPARATUS WITH TORQUE LIMITING MECHANISM

(71) Applicant: Cummins Filtration IP, Inc., Columbus, IN (US)

(72) Inventors: Kurt M. A. Badeau, Evansville, WI (US); Travis E. Goodlund, McFarland, WI (US); Bryan J. Benz, Evansville, WI (US); Bryan P. Steffen, Oregon, WI (US); Ismail C. Bagci, Cookeville, TN (US); Aaron M. Wells, Cookeville, TN (US); Rahul B. Kallurwar, Columbus, IN (US); James L. Eickhoff, Cookeville, TN (US); Chirag D. Parikh, Madison, WI (US); Gregory W. Hoverson, Columbus, IN (US); Kevin C. South, Cookeville, TN (US); Scott G. Manke, Sun Prairie, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 1238 days.

This patent is subject to a terminal disclaimer.

(21) Appl. No.: 15/068,130

(22) Filed: Mar. 11, 2016

(65) Prior Publication Data

US 2016/0193554 A1 Jul. 7, 2016

Related U.S. Application Data

(62) Division of application No. 13/445,499, filed on Apr. 12, 2012, now Pat. No. 9,308,475.

(Continued)

(51) Int. Cl.
*B01D 35/30* (2006.01)
*B01D 35/14* (2006.01)
(Continued)

(52) U.S. Cl.
CPC ............. *B01D 35/14* (2013.01); *B01D 27/08* (2013.01); *B01D 35/005* (2013.01); *B01D 35/30* (2013.01);
(Continued)

(58) Field of Classification Search
CPC ...... B01D 35/14; B01D 35/30; B01D 35/306; B01D 27/08; B01D 35/005;
(Continued)

(56) References Cited

U.S. PATENT DOCUMENTS 2,418,777 A 4/1947 Le Clair
5,259,953 A 11/1993 Baracchi et al.
(Continued)

FOREIGN PATENT DOCUMENTS

DE 10 2009 017 086 12/2009
EP 1 889 792 2/2008

OTHER PUBLICATIONS

Search Report for PCT Application No. PCT/US2012/033311, dated Sep. 27, 2012, 3 pages.
(Continued)

*Primary Examiner* — Thomas M Lithgow
(74) *Attorney, Agent, or Firm* — Foley & Lardner LLP

(57) ABSTRACT

A filter apparatus is described that has a torque limiting device, which may be a clutch mechanism, and which provides a protective function for a filter, so as to protect a filter from being over tightened and to thereby prevent damage to filter components. The clutch mechanism can also eliminate or reduce the need for torque measurement of certain filter components. The clutch mechanism can be located on one of the fluid filter, a filter head which engages the fluid filter, or a combination of both the fluid filter and the filter head.

14 Claims, 19 Drawing Sheets

Related U.S. Application Data

(60) Provisional application No. 61/474,493, filed on Apr. 12, 2011.

(51) Int. Cl.
 B01D 27/08 (2006.01)
 B01D 35/00 (2006.01)

(52) U.S. Cl.
 CPC ........ B01D 35/306 (2013.01); *B01D 2201/24* (2013.01); *B01D 2201/301* (2013.01); *B01D 2201/302* (2013.01); *B01D 2201/303* (2013.01); *B01D 2201/305* (2013.01); *B01D 2201/40* (2013.01); *B01D 2201/4023* (2013.01); *B01D 2201/4076* (2013.01); *B01D 2201/4084* (2013.01); *Y10T 29/49826* (2015.01)

(58) Field of Classification Search
 CPC ...... B01D 2201/4023; B01D 2201/301; B01D 2201/303; B01D 2201/305; B01D 2201/40; B01D 2201/4076; B01D 2201/4084; B01D 2201/24; Y10T 29/49826
 USPC ........................................................ 210/232
 See application file for complete search history.

(56) References Cited

U.S. PATENT DOCUMENTS

| | | |
|---|---|---|
| 5,744,030 A | 4/1998 | Reid et al. |
| 6,565,743 B1 | 5/2003 | Poirier et al. |
| 9,308,475 B2 * | 4/2016 | Badeau ................ B01D 35/306 |
| 2007/0187316 A1 | 8/2007 | Weinberger et al. |

OTHER PUBLICATIONS

Written Opinion for PCT Application No. PCT/US2012/033311, dated Sep. 27, 2012, 4 pages.

\* cited by examiner

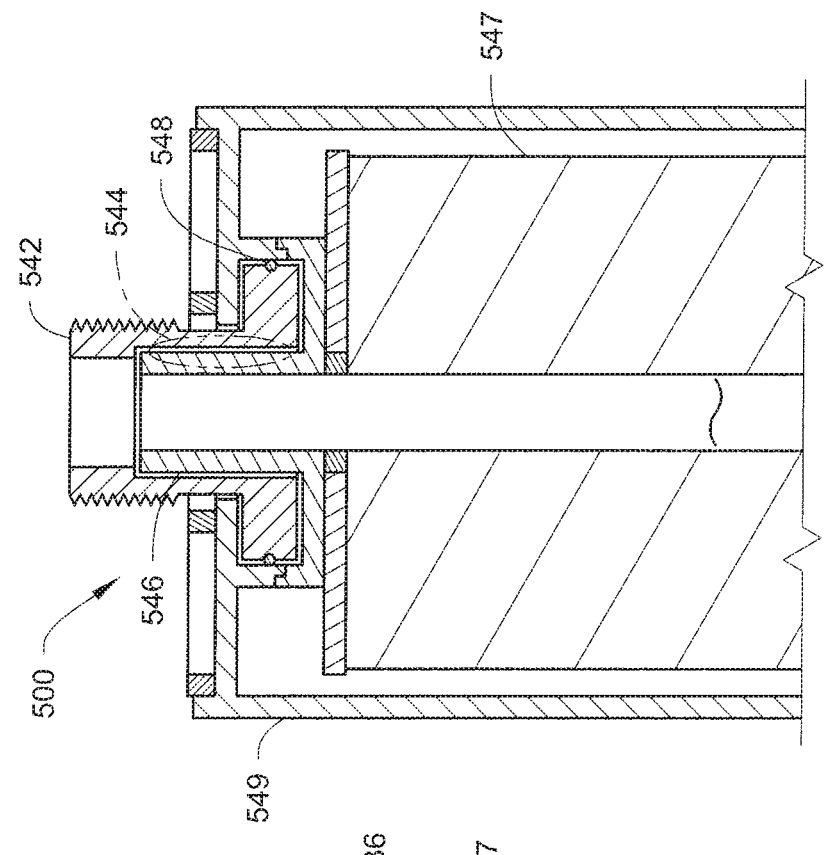
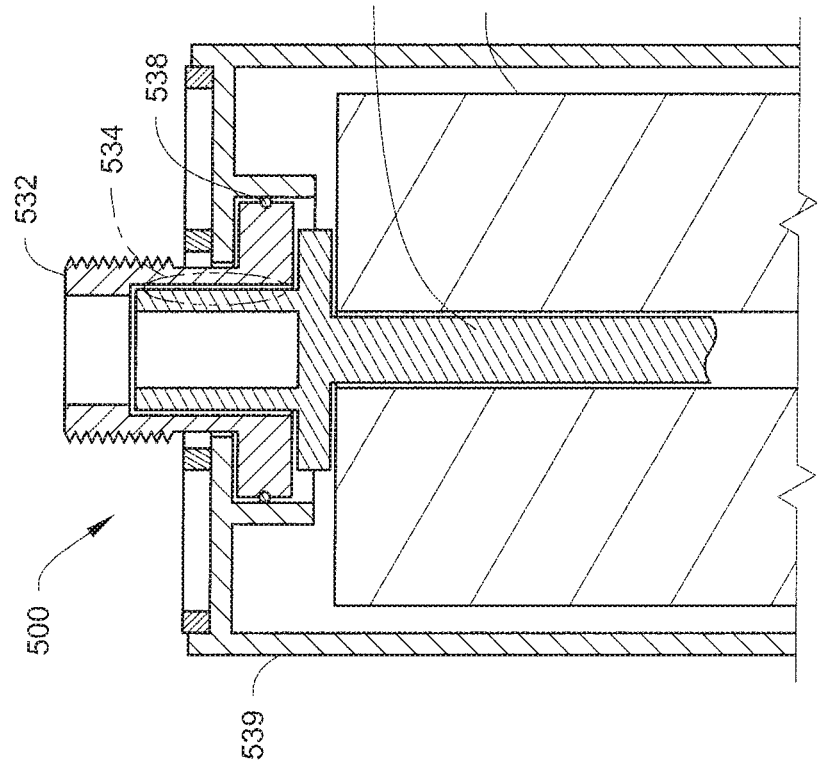
Fig. 11A
Fig. 11B

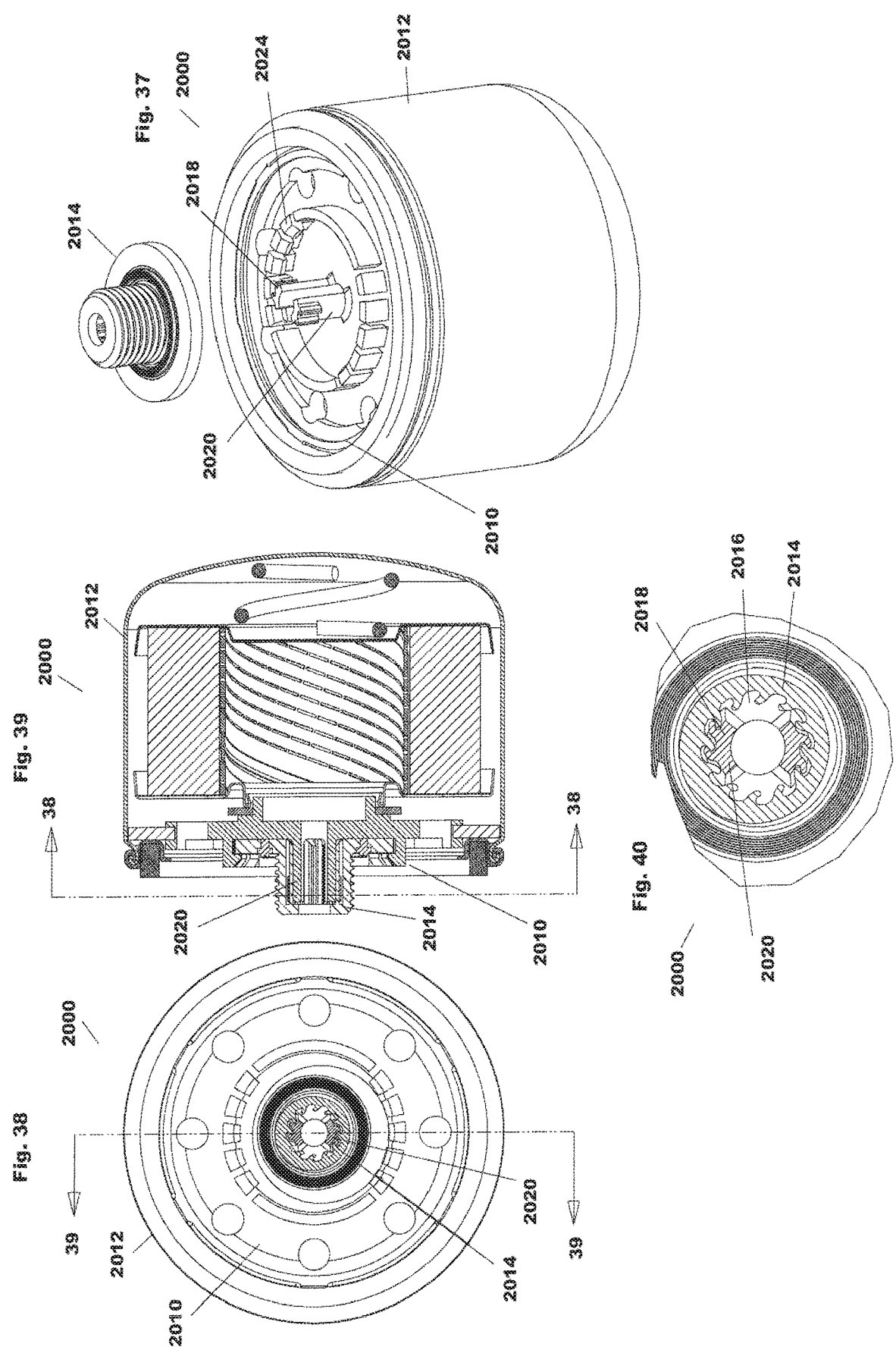

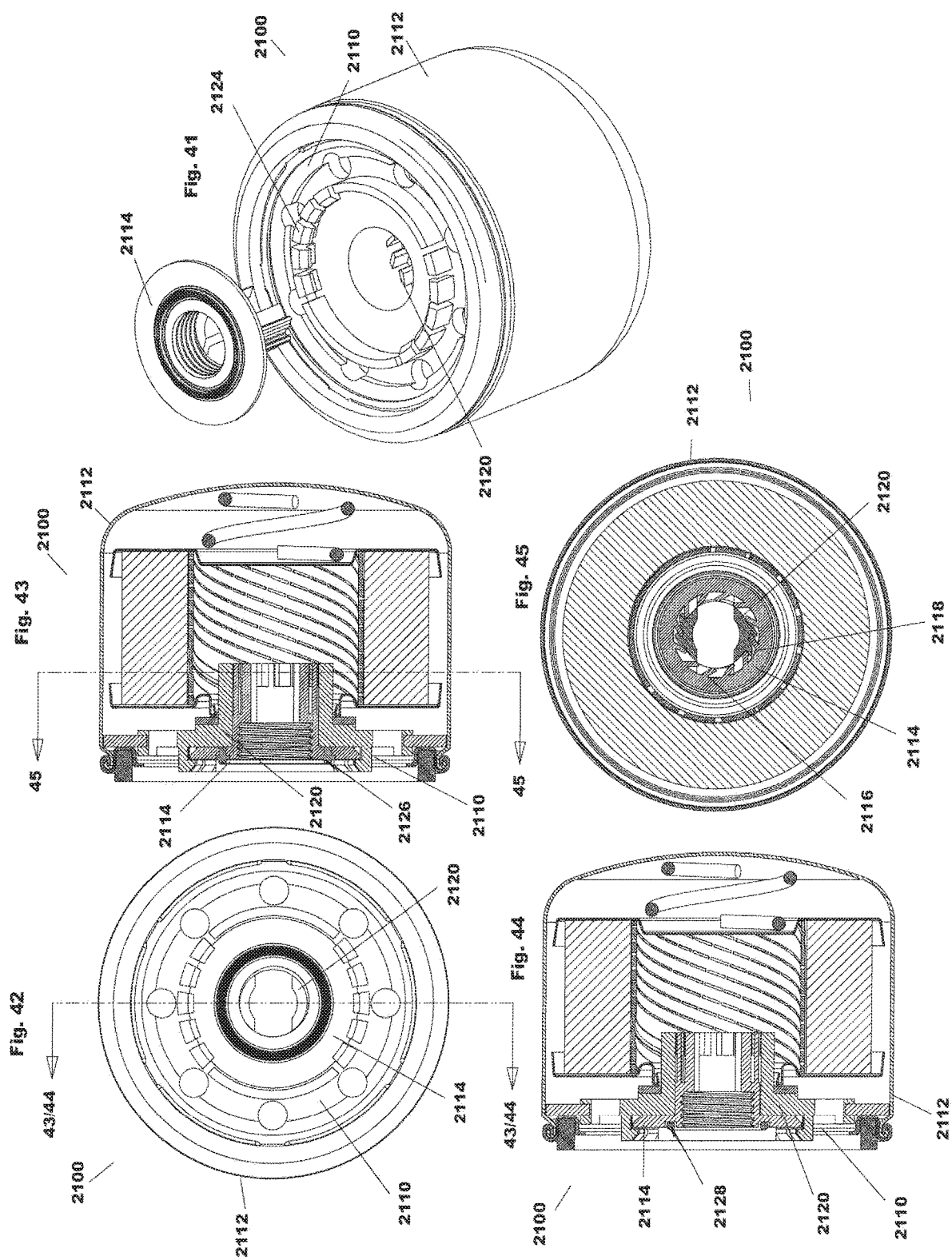

FILTER APPARATUS WITH TORQUE LIMITING MECHANISM

CROSS-REFERENCE TO RELATED APPLICATIONS

This application is a divisional of U.S. patent application Ser. No. 13/445,499, filed Apr. 12, 2012, which claims the benefit of U.S. Provisional Application No. 61/474,493 filed on Apr. 12, 2011. The contents of both applications are hereby incorporated by reference in their entirety the entirety.

FIELD

The disclosure herein generally relates to filter installation, servicing, and replacement. In particular, the disclosure herein relates to a filter apparatus employing a torque limiting mechanism that can prevent or at least minimize over tightening of a filter so as to avoid the occurrence of damage.

BACKGROUND

During installation, servicing, and/or replacement of filters, for instance liquid fluid filters, there can be a risk of over tightening the filter assemblies. Such over tightening can cause damage to filter assembly components.

For example, service technicians have used tools such as a strap wrench or socket drive, depending on the type of filter, to install or service a filter on an engine. Such installation or servicing often includes connecting a filter to a filter head by a threaded engagement. However, such tools do not indicate when to stop tightening the filter. Thus, over tightening can occur which has caused some filters to crack, such as for example cracking of the filter housing or shell. The over tightening of a filter housing or shell can lead to pre-mature failure of the components and seals. Typically, filter seals will expand when subjected to heat and fluids for extended periods, therefore increasing the load on the filter as well as increasing the necessary torque for removal.

To reduce the risk of over tightening, torque measuring has provided predetermined torque specifications, which require one to torque the filter to the engine specification. However, one may still over tighten and/or over torque filter components, for example, by manually overriding such specified torque measurements.

Improvements may be made upon existing filter designs so as to prevent over tightening and filter component damage.

SUMMARY

Generally, an improved filter apparatus is described herein that has a torque limiting device, which may be a clutch mechanism, and which can activate once a certain torque is reached. The torque limiting device can protect a filter from being over tightened and thereby prevent damage to filter components, and can also eliminate or reduce the need for torque measurement of certain filter components.

The filter apparatus described herein can be useful in various filtration applications, including for example filters that are used in liquid filtration, such as lubrication, fuel, and diesel exhaust fluid filtration, as well as filtration applications that do not employ liquid filters, such as filters for crankcase ventilation, and air. It will be appreciated that the filter apparatus herein may be useful in filtration applications other than those just mentioned, and where there may be a general need to prevent over tightening of filter component(s).

Generally, the filter apparatuses herein have a clutch mechanism that is located on one of the fluid filter that connects to the engine, the filter head that engages the fluid filter, or a combination of both the fluid filter and the filter head, where some clutch mechanism elements are on the fluid filter and some are on the filter head, such that the elements cooperate with each other when the fluid filter and filter head are connected.

In one embodiment, a filter apparatus includes a fluid filter that is connectable to an engine. The fluid filter includes a clutch mechanism on the fluid filter. In some embodiments, the clutch mechanism is on or proximate a top part of the fluid filter. For example, the clutch mechanism is disposed proximate the area of connection where the fluid filter connects to an engine. In some embodiments, the clutch mechanism is on a bottom of the fluid filter. In other embodiments, the clutch mechanism is on a side of the filter.

In one embodiment, a filter apparatus includes a filter head. The filter head includes a clutch mechanism. In some examples, the clutch mechanism is proximate a connecting spud of the filter head.

In other embodiments, a filter apparatus includes both a filter body and a filter head. The filter body and filter head have an interface. A clutch mechanism is disposed at the interface where the filter body and filter head. In some embodiments, the clutch mechanism has elements that are on the fluid filter and some that are on the filter head. The elements cooperate with each other when the fluid filter and filter head are connected.

In one embodiment, a method of connecting a fluid filter to an engine includes engaging the fluid filter with a filter head. The fluid filter is then tightened with the filter head. Further tightening is limited due to activation of a clutch mechanism, which prevents over tightening and can also provide an indication that connection is complete.

BRIEF DESCRIPTION OF THE DRAWINGS

The drawings herein show and provide description as to various inventive concepts of a torque limiting devices, which may include a clutch mechanism, that are employed in fluid filters and/or filter heads, as well as their systems and components.

FIG. 11A is a side view of fluid filter that incorporates a torque limiting device incorporating the spud utilizing an internal clutching mechanism shown in FIG. 9

FIG. 11B is a side view of fluid filter that incorporates a torque limiting device incorporating the spud utilizing an internal clutching mechanism shown in FIG. 9.

FIG. 37 is a perspective view of another embodiment of torque limiting device which may be incorporated in a filter apparatus.

FIG. 38 is a top view in partial section of the filter apparatus with torque limiting device of FIG. 37.

FIG. 39 is a side sectional view of the filter apparatus with torque limiting device of FIG. 37.

FIG. 40 is a close up view of FIG. 38 showing the torque limiting device of FIG. 37.

FIG. 41 is a perspective view of another embodiment of torque limiting device which may be incorporated in a filter apparatus.

FIG. 42 is a top view of the filter apparatus with torque limiting device of FIG. 41.

FIG. 43 is a side sectional view of the filter apparatus with torque limiting device of FIG. 41.

FIG. 44 is another side sectional view of the filter apparatus with torque limiting device of FIG. 41.

FIG. 45 is a bottom sectional view showing the torque limiting device of FIG. 41.

DETAILED DESCRIPTION

FIGS. 1-45 illustrate and the following describes exemplary embodiments of a filter apparatus with a torque limiting device, which may also include a clutch mechanism. The torque limiting device can provide a protective function for a filter, and can activate once a certain torque is reached. The torque limiting device can protect a filter from being over tightened and thereby prevent damage to filter components. A torque limiting device and a clutch mechanism described herein can also eliminate or reduce the need for torque measurement of certain filter components. It will be appreciated that the filter apparatus described herein can be useful in various filtration applications, including for example filters that are used in liquid filtration, such as lubrication, fuel, and diesel exhaust fluid filtration, as well as filtration applications that do not employ liquid filters, such as filters for crankcase ventilation, and air. It will be appreciated that the filter apparatus herein may be useful in filtration applications other than those just mentioned, and where there may be a general need to prevent over tightening of filter component(s).

Generally, the filter apparatuses herein have a torque limiting device that is located on one of the fluid filter that connects to the engine, the filter head that engages the fluid filter, or a combination of both the fluid filter and the filter head, where some elements of the torque limiting device are on the fluid filter and some are on the filter head, such that the elements cooperate with each other when the fluid filter and filter head are connected. For example, the torque limiting device can include a clutch mechanism with clutch elements on the fluid filter, the filter head, or on both the fluid filter and filter head. It will be appreciated that the torque limiting device could be integral to the gasket section and/or integral to the head assembly.

For example, the clutch mechanism can be located on the top, bottom, or side of the fluid filter, and may be on or near various structural components of the fluid filter, such as for example on the fluid filter's spud, nutplate, nutplate to can/housing interface, the collar, or the bottom of the housing, such as at a drive area. In other examples, the clutch mechanism may be located on the spud of the filter head that connects with the fluid filter or located on another component of the filter head. In some circumstances, it may be desirable to have the clutch mechanism closer in proximity to where the fluid filter is to be attached to the engine, such as for example near a connection of the fluid filter and a filter head. The following figures provide additional embodiments of a clutch mechanism for a filter apparatus.

Figure 1:
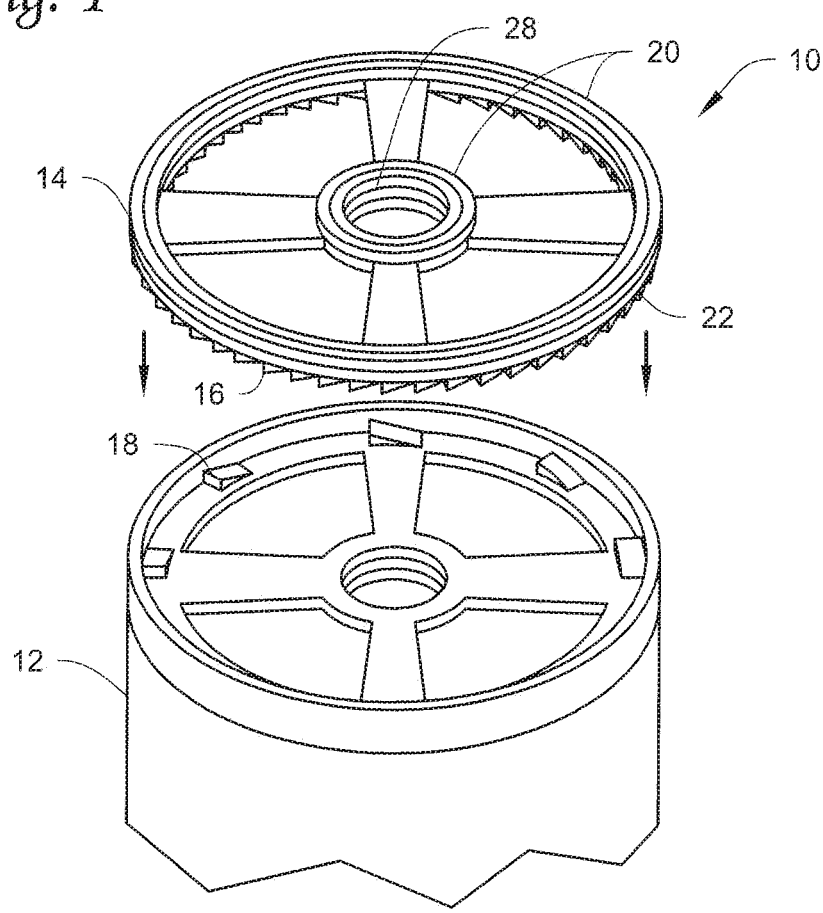
FIG. 1 is a partial top perspective view of one embodiment of a fluid filter with a torque limiting device.
Figure 2:
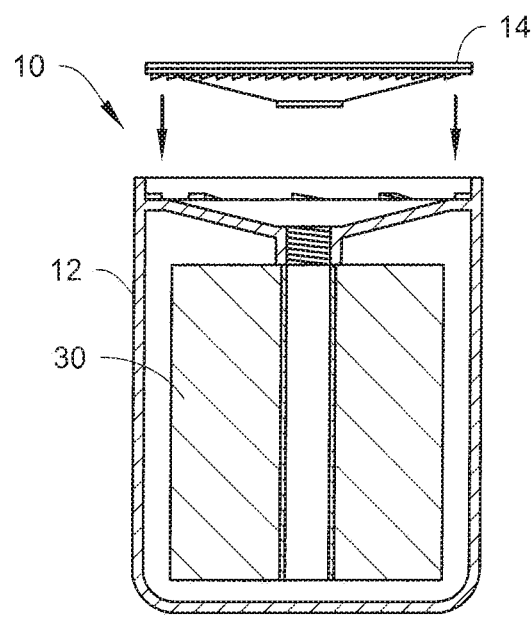
FIG. 2 is a side sectional view of the fluid filter with the torque limiting device of FIG. 1.
Figure 3:
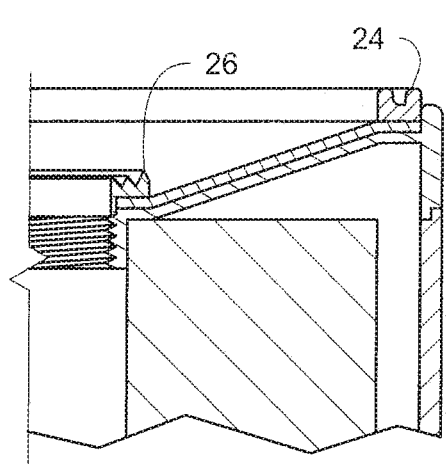
FIG. 3 is a partial side sectional view of one embodiment of a seal configuration such as for the fluid filter with the torque limiting device of FIG. 1.
Figure 4:
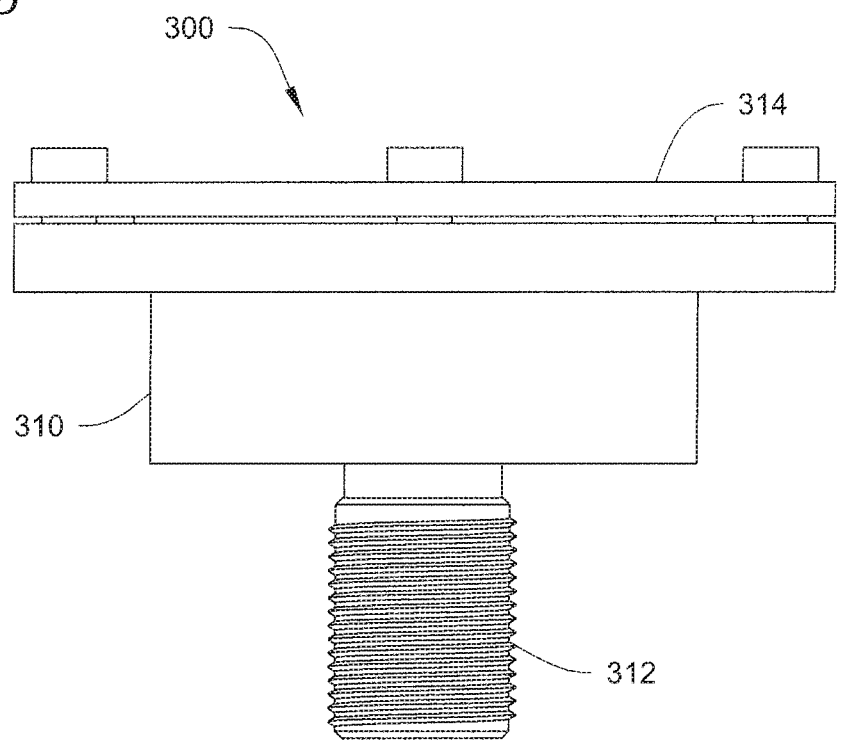
FIG. 4 is a side view of another embodiment of a filter apparatus with a torque limiting device.
Figure 5:
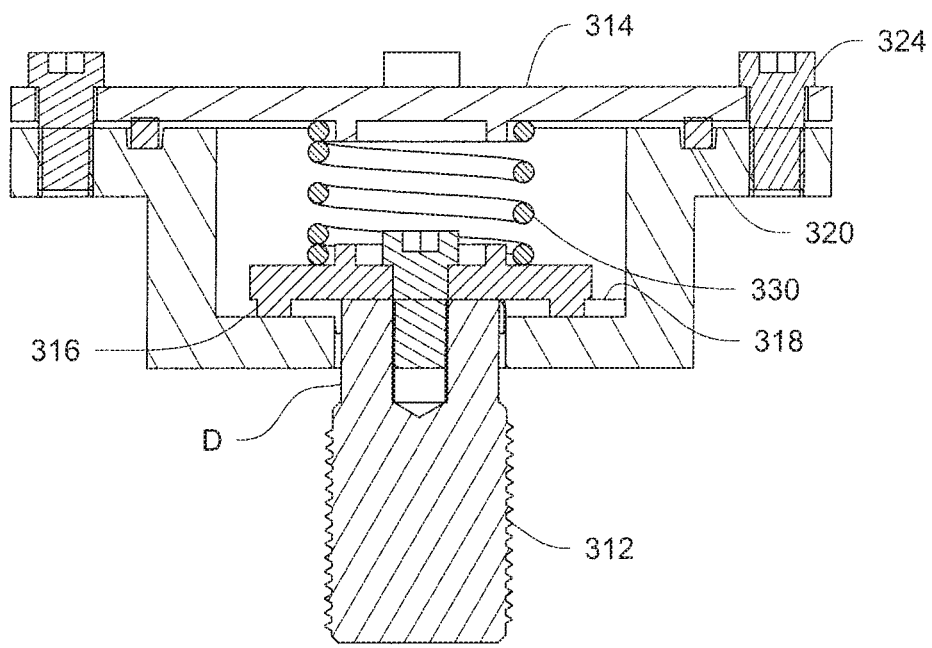
FIG. 5 is a side sectional view of the filter apparatus of FIG. 4.
Figure 6:
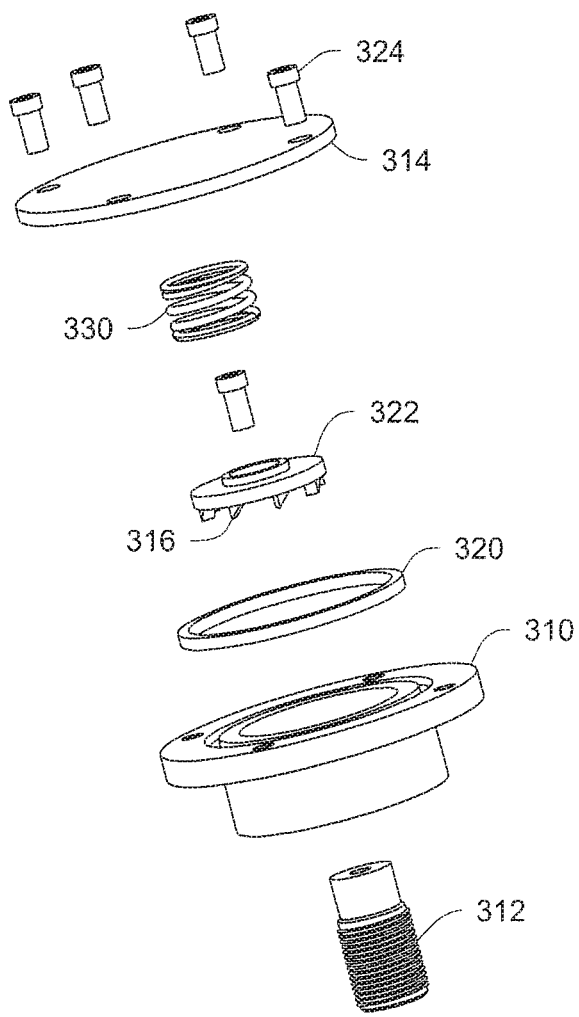
FIG. 6 is an exploded view of the filter apparatus of FIG. 4.
Figure 7:
FIG. 7 is an exploded view of the torque limiting device of FIG. 4.
Figure 7:
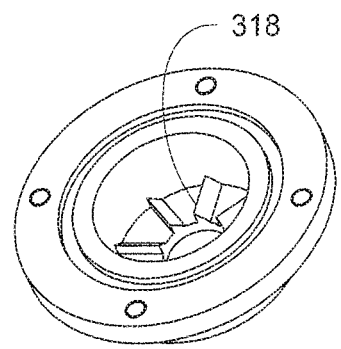
Figure 8:
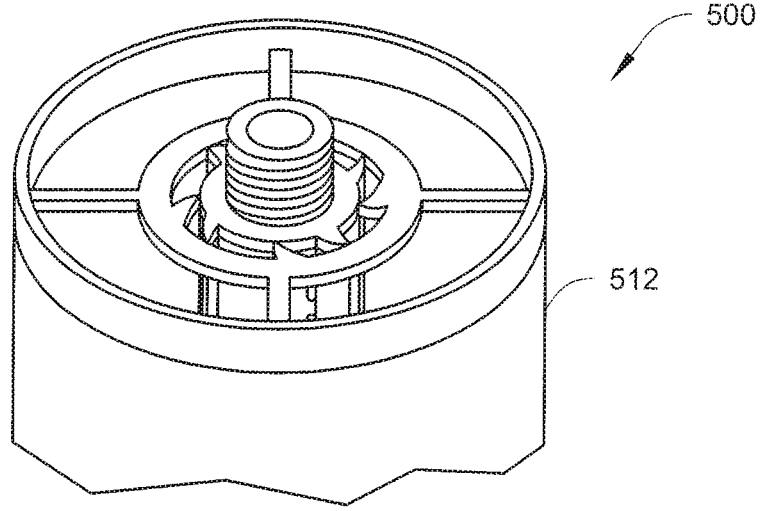
FIG. 8 is a partial top perspective view another embodiment of a filter apparatus with a torque limiting device.

With reference to FIGS. 1-3, a filter apparatus 10 includes a fluid filter having a housing 12 that connects with a nutplate 14. The housing 12 has an inner volume that houses a filter media 30. The nutplate 14 includes a connective portion 28. In one embodiment, the connective portion 28 is a hole with an annular thread that allows the fluid filter to be connected to an engine, for example to a spud on a filter head.

It will be appreciated that the term "connective portion" is not meant to be limited to threads, a threaded engagement, or the like, and in the embodiments shown and described with respect to any of FIGS. 1-36, references to such threaded connections is merely exemplary and is meant to refer to connective portions in general as connection structures other than threaded connections may be employed, for example but not limited to snap fits, interference fits, and other mechanical structures that would be suitable for connection.

A clutch mechanism is provided by ratchets 16 on the bottom of the nutplate 14 and ratchets 18 on the top of the housing 12. The ratchets 16, 18 are shown as two surfaces with ramps, the ramps cooperate such that when the fluid filter is tightened to an engine, e.g. connected with a filter head, the ratchets 16, 18 provide a torque limiting feature so as to prevent over tightening of the fluid filter. For example, the ratchets 16, 18 can continue to allow rotation between the nutplate 14 and the housing 12 in the tightening direction which provides slippage, where the fluid filter would not be over tightened at the connective portion 28. That is, the two ramped surfaces interface to allow slippage (rotation) when desired torque is reached in the tightening direction, and provide a non-slipping engagement in the loosening direction. As shown, the ratchets of the clutch mechanism are in an axial configuration.

The nutplate 14 includes a seal configuration on its top surface. The seal configuration axially seals the fluid filter to the engine, for example when the fluid filter is connected to a filter head. As shown in FIG. 1, the seal configuration has inner and outer floating seals 20 on inner and outer overmold rings of the nutplate 14. In other embodiments, the inner and outer seals may be a double 24 or triple 26 ribbed gaskets, such as shown in FIG. 3. It will be appreciated that other seal configurations may be employed and that the filter apparatus 10 is not limited to the particular seal configurations shown.

Returning to the structure of the clutch mechanism, it will be appreciated that the mechanical implementation of the clutch mechanism can be accomplished in a variety of ways using a variety of structures, and is therefore not meant to be limiting. Other options that could be used for the clutching mechanism can include for example spring loaded balls into detente areas, rotating collars for large filters, flexible tabs, and springs. For example, the clutch mechanism can include flexible fingers within a circular disk which slide and/or lock against ramped teeth. It also will be appreciated that the orientation of the clutch mechanism is not meant to be limiting. For example, FIGS. 1-3 show an axially configured clutch, but it will be appreciated that a radially configured clutch mechanism or other orientations may be employed as appropriate.

FIGS. 4-7 show another embodiment of a filter apparatus 300 having an axial ramp configured clutch mechanism. The clutch mechanism can reside in a filter head structure that is connectable to a fluid filter. As shown, the filter apparatus 300 has an assembly access plate 314 that connects to an engine, for example through fasteners such as bolts 324. A face seal 320 seals the access plate 314 side of the filter apparatus 300. The apparatus 300 includes a connective portion 312, shown for example as a spud, which is used to connect with a fluid filter, such as by a threaded engagement. The apparatus further includes a spring 330 disposed between the access plate 314 and spud 312. The clutch mechanism is shown as axial ramp surfaces 316, 318 (close up shown in FIG. 7). Axial ramp surface 316 is on clutch element 322, which is shown connected to the spud 312 through a fastener such as a bolt. Axial ramp surface 318 is on the main body 310. The axial ramp surfaces 316, 318 provide a torque limiting feature that allows slippage by the surfaces 316, 318 riding on each other. The tooth design of the ramp surfaces 316, 318 can be angled or ramped for the tightening direction, but may have an upright surface, e.g. at about 90 degrees, so that there is no slippage in the loosening direction. The spring 330 provides another protective feature. The spring 330 allows axial movement of the spud 312, such that the ramp surfaces can be cleared of each other and slippage is allowed in both the tightening and loosening directions. Apparatus 300 can also include a distance D that allows the spud 312 to be partially inserted into the space between the access plate 314 and spud 312. The spring size can be dependent upon the torque requirement of the component and the angle of the tooth design of the ramp surfaces.

Figure 9:
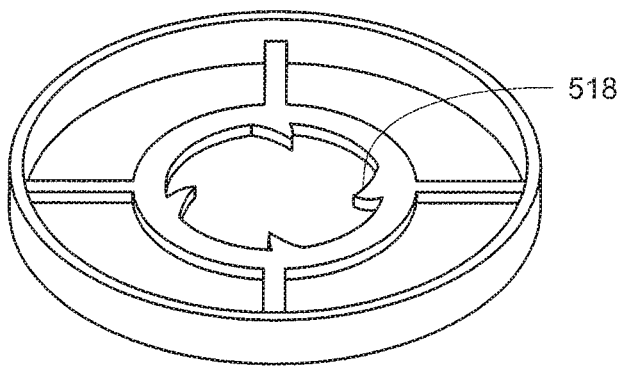
FIG. 9 is a top perspective view of the torque limiting device of the filter apparatus of FIG. 10, where some features are also shown in FIGS. 11A and 11B.
Figure 9:
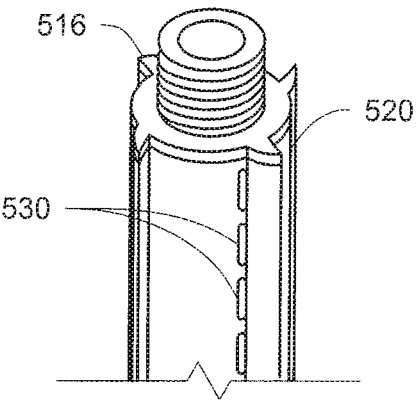

FIGS. 8-11B show further embodiments of filter apparatuses that have a clutch mechanism, where the clutch mechanism resides on or proximate the spud of a fluid filter. In the example shown in FIG. 8, the filter apparatus 500 has a clutch mechanism with radial ramps 516, 518 (best shown in FIG. 9) that ride on each other to allow slippage in the tightening direction, but not in the loosening direction. The clutch mechanism is located at the spud 514 of the fluid filter 512. In the embodiment shown, the spud 514 can engage a ribbed center tube (520 shown in FIG. 9) that is slotted to provide torque limiting. The ribbed center tube has radial ramps at the slots to provide the torque limiting function. FIG. 9 shows one embodiment of such a clutch mechanism with a ribbed center tube 520 that would engage the spud 514. Slots 530 are on the ramps 516 which allow a click flex with the ramps 518. As shown, ramps 518 are on a ring portion, for example at the top of the nutplate.

Figure 10:
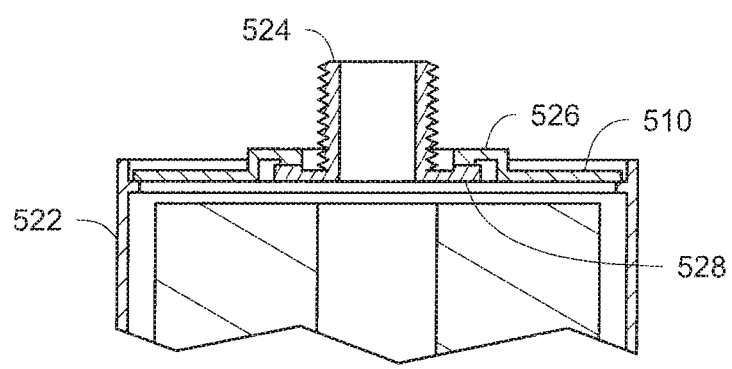
FIG. 10 is a side sectional view of another embodiment of a filter apparatus with a torque limiting device.
Figure 12A:
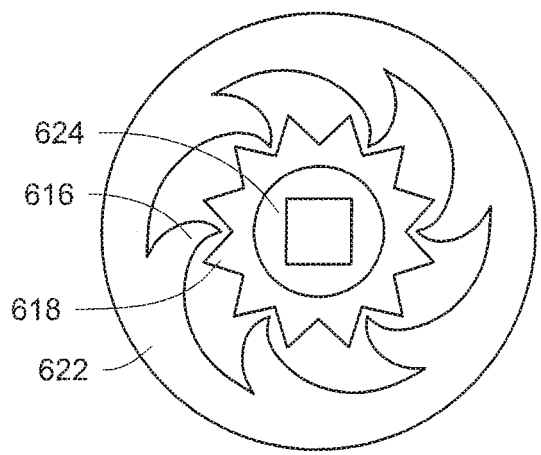
FIG. 12A is a bottom view of another embodiment of a filter apparatus with a torque limiting device.
Figure 12B:
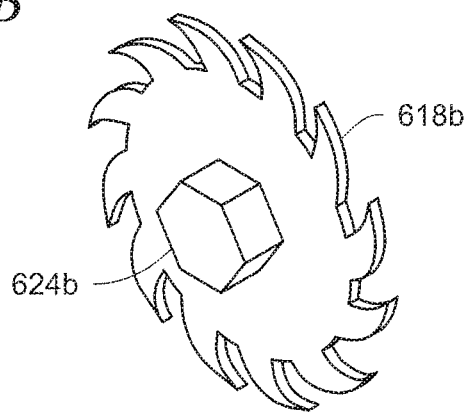
FIG. 12B is a bottom perspective view of another embodiment of a filter apparatus with a torque limiting device.
Figure 13:
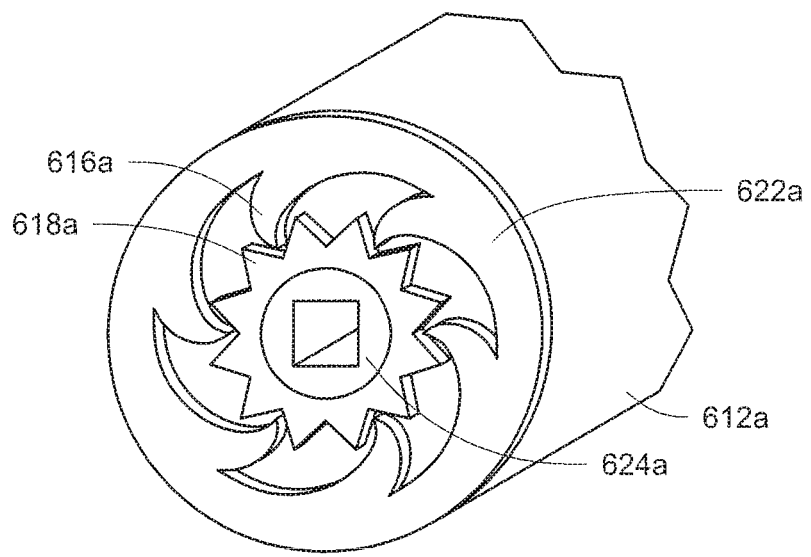
FIG. 13 is a bottom perspective view of another embodiment of a filter apparatus with a torque limiting device.

FIG. 10 shows an embodiment of a clutch mechanism near the spud of the fluid filter. Nutplate 510 may be separately attached to the shell 522 of the fluid filter (see arrows of FIG. 10), such as for example by a spin weld. As shown in FIG. 10, the clutch mechanism is shown as clutch elements 526 and 528 that are proximate the spud 524. The clutch elements 526, 528 may be configured with axial ramps, such as shown in FIGS. 4-7.

FIG. 11A shows an embodiment of a clutch mechanism in the spud 532 of the fluid filter 500. The ribbed center tube 536 and spud 532 (region 534) may be configured with ramps, such as shown in FIG. 9. Center tube 536 can be attached to the shell 539 so force applied to the bottom or side of the filter can cause the center tube 536 and spud 532 to engage and function as the clutch mechanism. Filter media 537 is represented for reference only, and seal 538 may seal between the spud 532 and the shell 539.

FIG. 11B shows an embodiment of a clutch mechanism in the spud 542 of the fluid filter 500. The ribbed center tube 546 portion of the filter shell 549 and spud 542 (region 544) may be configured with ramps, such as shown in FIG. 9. Tube section 546 is attached to shell 549 so force applied to the bottom or side of filter can cause center tube 546 and spud 542 to engage and function as the clutch mechanism. Filter media 547 is represented for reference only, and seal 548 may seal between the spud 542 and the shell 549.

Figure 14:
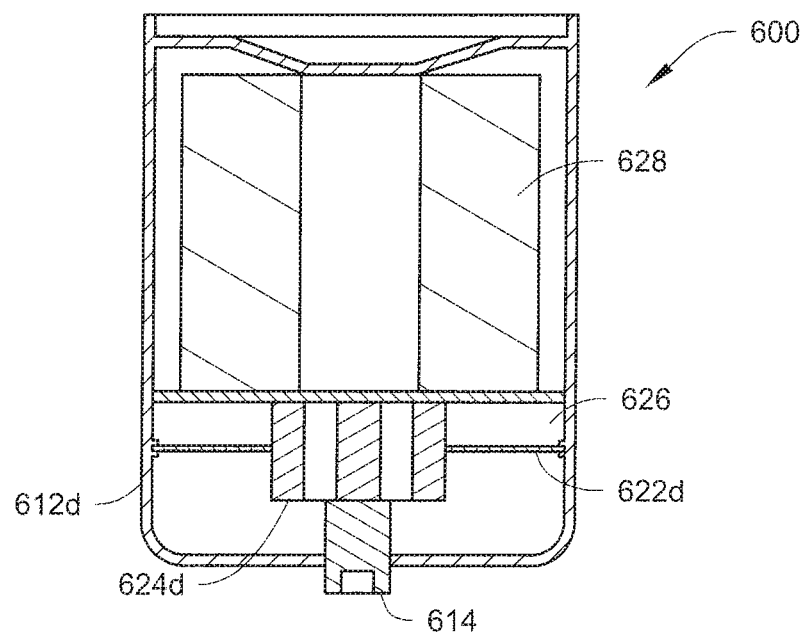
FIG. 14 is a side view of fluid filter that incorporates a torque limiting device, such as in FIGS. 12A, 12B, and 13.
Figure 15:
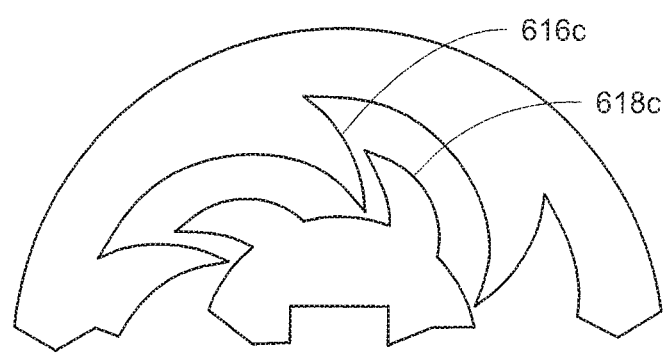
FIG. 15 is a close up view showing operation of a torque limiting device, such as shown in FIGS. 12A, 12B, and 13.

FIGS. 12A-15 show another embodiment of a clutch mechanism that is located on the bottom of the fluid filter, for example on a drive area 614 of fluid filter 600 (see FIG. 14). The clutch mechanism includes radial ramps 616, 616a that engage radial ramps 618, 618a (see FIGS. 12A and 13). FIG. 12B shows another example of radial ramps 618b and drive area 624b that can be employed instead of the drive area 624, 624a and radial ramps 616, 616a of FIGS. 12A and 13. In some embodiments, the radial ramps 616, 616a reside on a spring plate 622, 622a (see also e.g. spring plate 622d in FIG. 14), which may be fixed to a shell or housing 612a, 612d of fluid filter 600, and the radial ramps 618, 618a can reside on a torque drive e.g. 624, 624a, 624b, 624d. In this embodiment, a portion of the clutch mechanism is contained in a portion of the filter housing e.g. 612a, 612d that is a separate, isolated chamber 626 from that containing the fluid being filtered and the filter media 628 (see FIG. 14). FIG. 15 shows another example how radial ramps (e.g. 616c, 618c) cooperate with one another, and which may be applied on a spring plate, e.g. spring plate 622d of FIG. 14. In the tightening direction, the ramps are allowed to ride along each other once a certain torque has been reached. This allows the slippage so that over tightening does not occur. In the loosening direction, the ramps do not allow relative rotation, thus providing a ratchet effect.

Figure 16A:
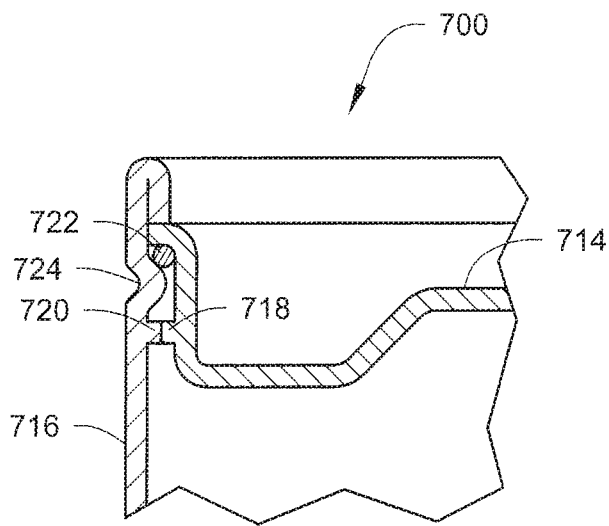
FIG. 16A is a partial side view of another embodiment of a filter apparatus with a torque limiting device.
Figure 16B:
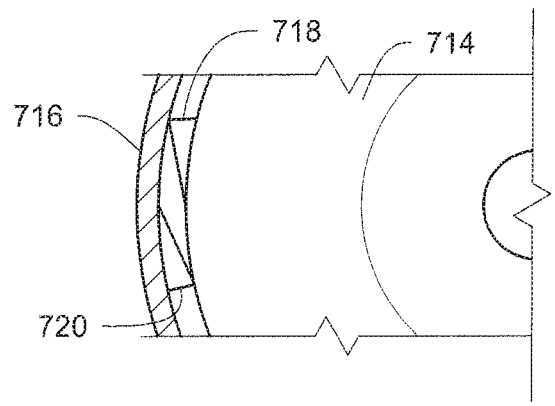
FIG. 16B is a partial top view of the filter apparatus with a torque limiting device shown in FIG. 16A.
Figure 17:
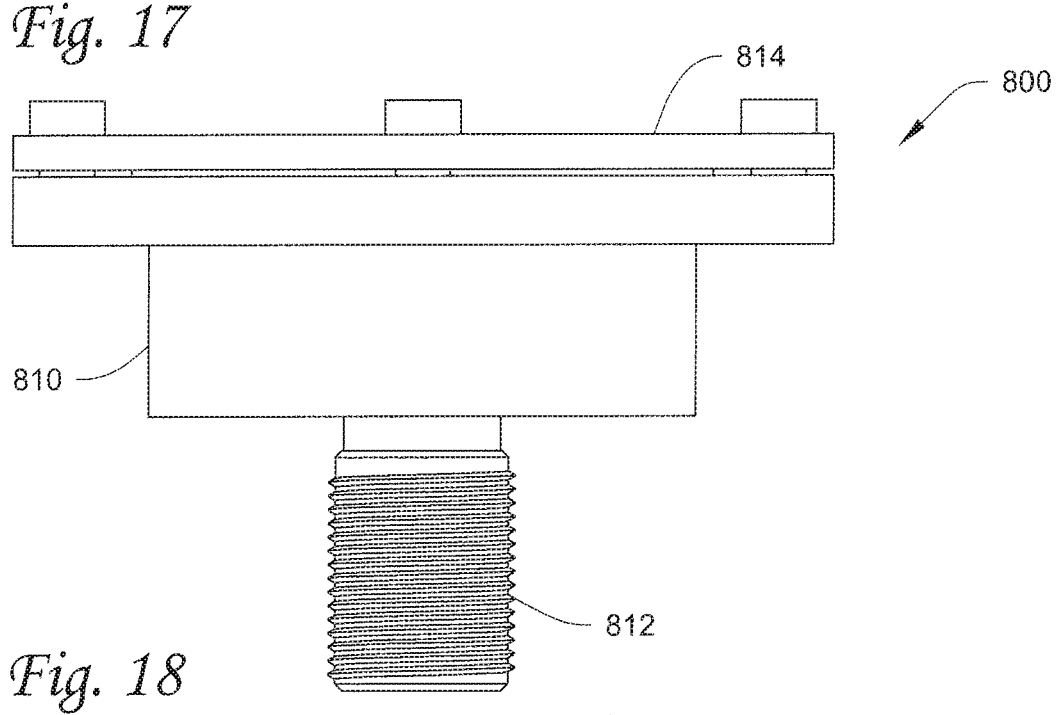
FIG. 17 is a side view of another embodiment of a filter apparatus with a torque limiting device.

FIGS. 16A and 16B show another embodiment of a filter apparatus 700 with a clutch mechanism. In some embodiments, a nutplate 714 has ramps or dimples 718 and a filter shell 716 which also has engaging features such as, ramps or dimples 720. The housing 700 would clutch when the nutplate 714 reached a predetermined torque and would lock when removing. The nutplate would get a ratcheting feature from designing either a ramp 718 or half dimple feature working with the housing feature 720 to slip or spin when a predetermined torque is met. Sealing would be achieved by placing a bead roll 724 in the shell to retain an o-ring or gasket 722.

FIGS. 17-21 show another embodiment of a filter apparatus 800 having a clutch mechanism with radially operating features. The clutch mechanism can reside in a filter head structure, e.g. 810, that is connectable to a fluid filter. As shown, the filter apparatus 800 has an assembly access plate 814 that connects to an engine, for example through fasteners such as bolts 824. A face seal 820 seals the access plate 814 side of the filter apparatus 800. The apparatus 800 includes a connective portion 812, shown for example as a spud, which is used to connect with a fluid filter, such as by a threaded engagement. The apparatus further includes a spring 830 disposed between the access plate 814 and clutch elements and spud 812. The clutch mechanism is shown as curved surfaces 816, 818 respectively on a clutch element 822 and an annular rim of an access plate 814. The curved surfaces 816, 818 are radially disposed (see e.g. FIG. 19). In the embodiment shown, surfaces 816 are shown as curved protrusions on the clutch element 822, which is connected to the spud through a fastener such as a bolt. Surfaces 818 are shown as curved recesses or notches radially disposed on the annular rim of the access plate 814. See FIG. 19. It will be appreciated that the configuration of the surfaces is not limited to that of FIGS. 17-21, for example, the annular rim may have the protrusions and the clutch element 822 may have the recesses. The annular rim of the access plate in some embodiments is relatively flexible so as to allow the clutch element 822 or disc to slip after a preset torque has been reached. The surfaces 816, 818 provide a torque limiting feature that allows slippage by the surfaces riding on each other.

In some embodiments, the annular rim of the access plate 814 is constructed as a composite component, so that the radial curved surfaces 818 on the downward extending annular rim can move outward (see outward arrows) when engaged with the curved protrusions 816 on the clutch element 822. Under a high enough torque, the clutch element 822 and spud 812 are allowed to rotate relative to the access plate 414.

Figure 18:
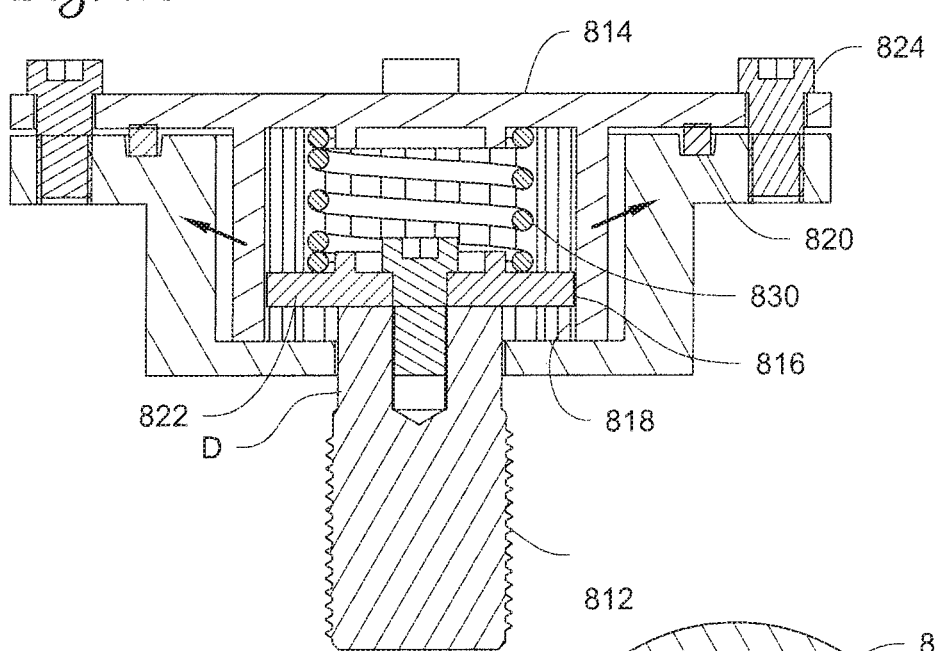
FIG. 18 is a side sectional view of the filter apparatus of FIG. 17.
Figure 19:
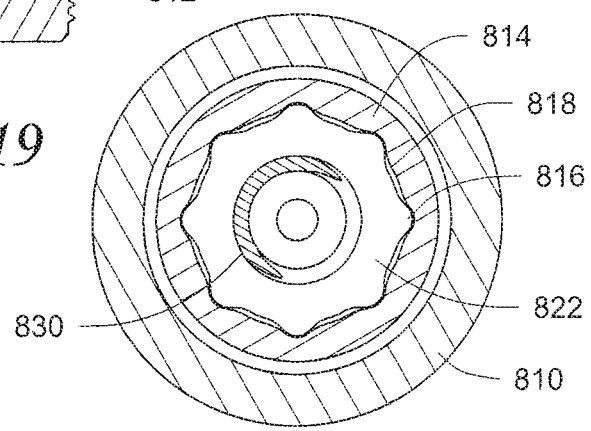
FIG. 19 is top sectional view of the torque limiting device of FIG. 17.
Figure 20:
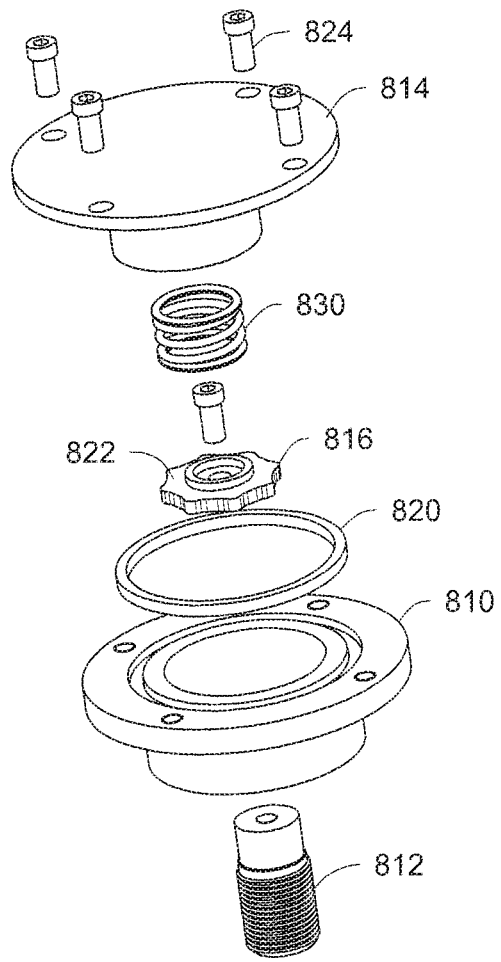
FIG. 20 is an exploded view of the filter apparatus of FIG. 17.
Figure 21:
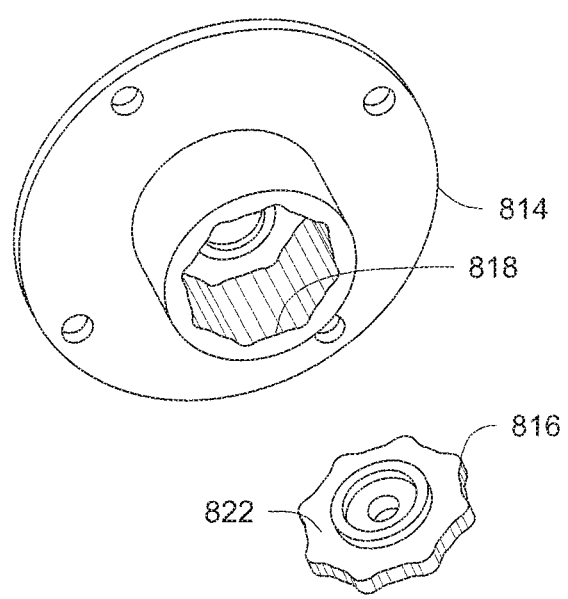
FIG. 21 is an exploded view of the torque limiting device of FIG. 17.

With reference to FIG. 18, apparatus 800 can also include a distance D that allows the spud 812 to be partially inserted into a space within the annular rim of the access plate 814.

Figure 22:
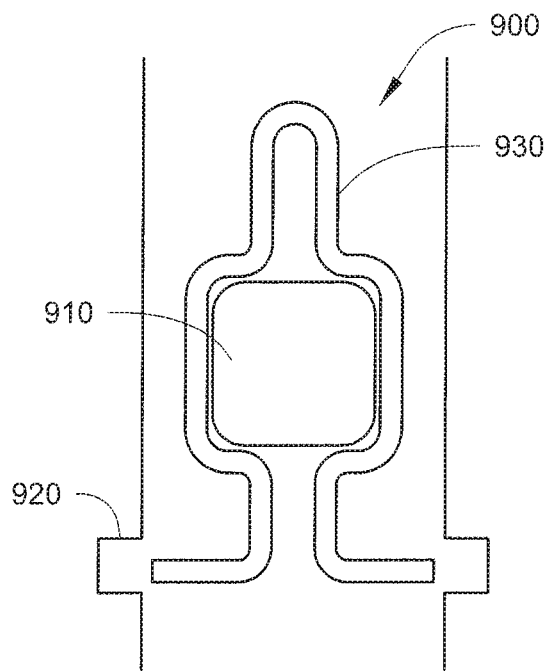
FIG. 22 is a side view of another embodiment of a torque limiting device which may be employed in a filter apparatus.
Figure 23:
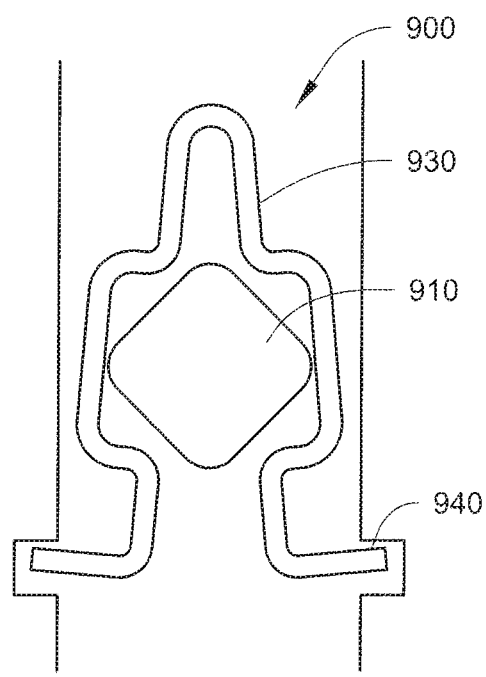
FIG. 23 is a side view of the torque limiting device of FIG. 22.

FIGS. 22 and 23 show another embodiment of a clutch mechanism 900. For example, a hex or multisided shaft that is held in place via a spring clip that expands when a specified or certain torque is reached. As shown, the clutch mechanism 900 includes shaft 910 held in place by spring clip 930. When the shaft 910 rotates and expands the spring clip 930, locks 940 engage within retaining grooves 920. The clutch mechanism 900 provides a free spinning configuration (e.g. in FIG. 22) and lock configuration (e.g. in FIG. 23). For example, rotation of shaft 910 opens the spring clip 930 and can lock a spud. The clutch mechanism can be actuated by connection of the fluid filter.

In a free state, an internal portion of the filter which attaches to a mating portion of the head will freely rotate. This can also hold true if the floating or rotating feature is a facet of the head itself. A feature (e.g. shaft 910) that is either an integral part of a filter head or filter housing will in some embodiments include a specific geometric shape which activates a specialized spring clip contained within. During installation, the rotation of this feature 910 in conjunction with the filter will engage and spread a self contained spring clip that will expand and lock against a surrounding wall or containment enclosure enabling a solid rotational union between the filter and head. When a design torque specific to the spring clip is reached, the spring will flex inward allowing a slipping action or ratcheting to occur. This will limit the amount of installation turns or torque which can be applied to the joint.

Figure 24:
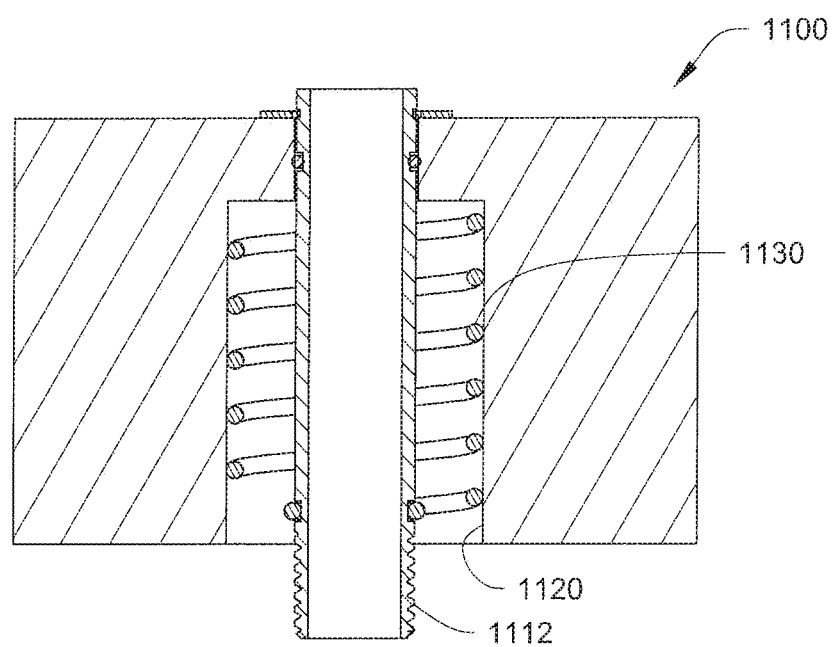
FIG. 24 is a side view of another embodiment of a torque limiting device which may be employed in a filter apparatus.
Figure 25:
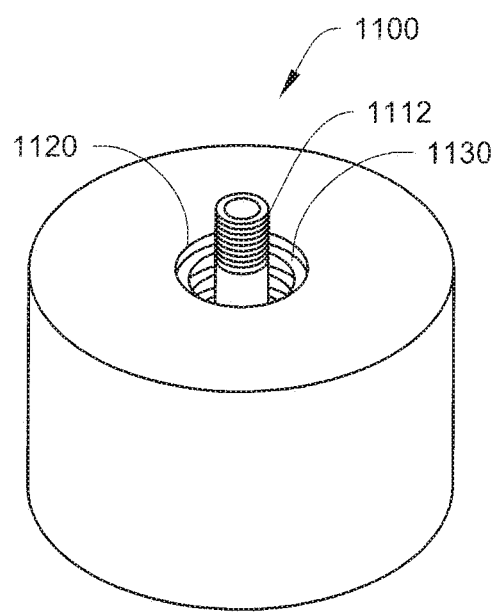
FIG. 25 is a bottom view of the torque limiting device of FIG. 24.
Figure 26:
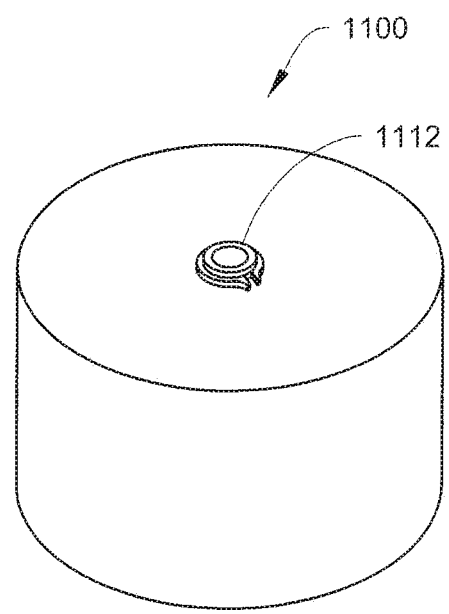
FIG. 26 is a top view of the torque limiting device of FIG. 24.

FIGS. 24-26 show another embodiment of a filter apparatus 1100 with a torque limiting mechanism. The torque limiting mechanism can reside in a filter head structure that is connectable to a fluid filter. In the embodiment shown, for example, the torque limiting mechanism is located at a spud 1112 of the filter head. As shown, the torque limiting mechanism has a spring 1130 that in some embodiments is reverse wound and press fit into a bore 1120, in which the spud 1112 resides. The spud has threads that are held stationary until a certain torque is reached, where slippage can occur so that a filter is not over tightened with the filter head. In a loosening direction, the spring 1130 expands so that there is no slippage and so as to allow removal of a fluid filter from the filter head. That is, the spring 1130 can be press fit into the bore 1120 and attached to the spud 1112. Threads on the spud 1112 are held stationary until a certain torque is reached to wind the spring and reduce its outer diameter. This causes friction to be reduced, which allows the spud to freely rotate, thus limiting filter installation torque, e.g. on the filter head. Upon removal, the spring 1130 can expand and return the outer diameter to the frictional engagement to hold the spud 1112 in place and allow for filter removal.

Figure 27:
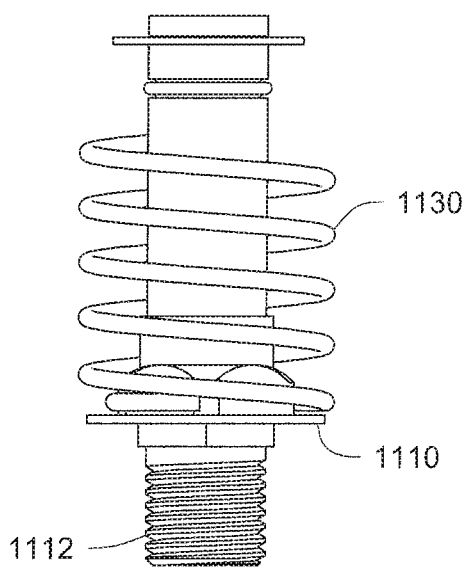
FIG. 27 is a side view of another embodiment of a torque limiting device which may be employed in a filter apparatus.

FIG. 27 shows an alternative to the interface of FIGS. 24-26. The spring 1130 can be engaged with an additional engagement member 1110 that is movable along the spud 1112. The engagement member 1110 can be moved by a part of a fluid filter to engage the spud 1112 to the spring 1130 and prevent free spinning.

Figure 28:
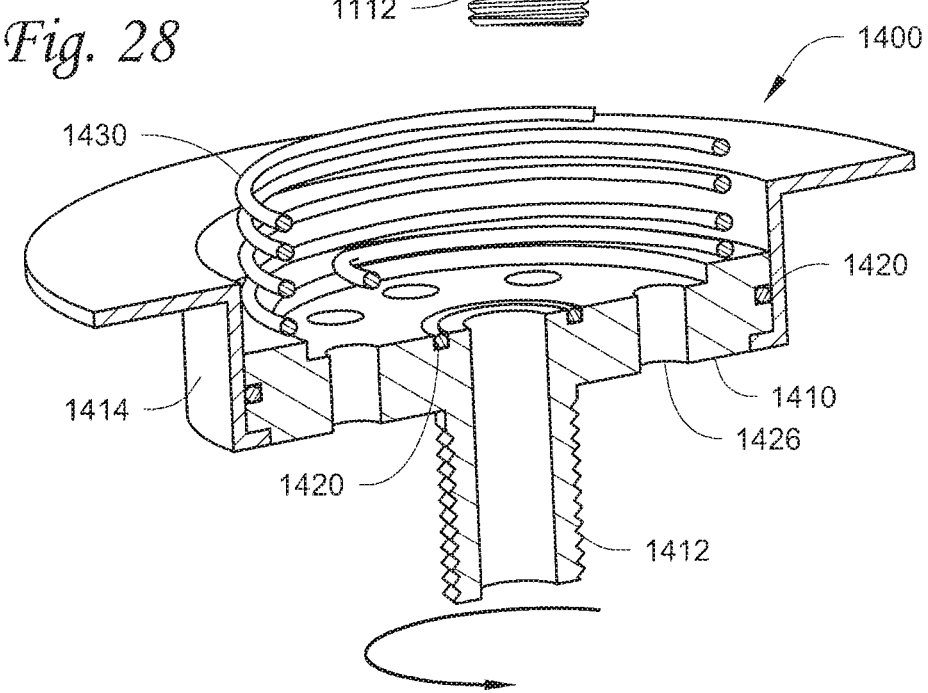
FIG. 28 is a perspective sectional view of another embodiment of a torque limiting device which may be employed in a filter apparatus.
Figure 29:
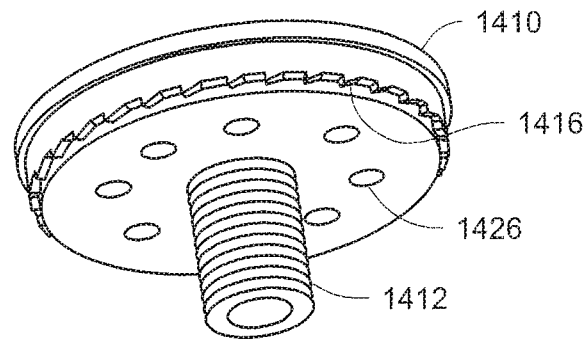
FIG. 29 is a perspective view of a portion of the torque limiting device of FIG. 28.

FIGS. 28-29 show additional embodiments of a filter apparatus 1400 with a torque limiting mechanism. The torque limiting mechanism can reside in a filter head structure that is connectable to a fluid filter. As shown, the filter apparatus 1400 has a body 1414 that connects to an engine. The body 1414 includes a collar that is sealed with plate 1410 having a spud 1412. The connective portion e.g. spud 1412, is used to connect the filter head with a fluid filter, such as by a threaded engagement. Fluid flow holes 1426 are provided through the plate 1410. The apparatus further includes a spring 1430. The spring 1430 is held in place by the collar of body 1414. When a certain torque is reached by applying a fluid filter, and that is greater than the force of the spring 1430, a rotation of the plate 1410 can occur which allows slippage. Seals 1420 seal the body 1414 with the plate 1410 and flow path through the spud 1412. The seals 1420 may be o-ring seals, since rotation of the plate 1410 is minimal and is used in a semi-static role.

In some embodiments, the apparatus 1400 has a clutch mechanism shown as axial ramp surfaces 1416. Axial ramp surface 1416 is on the plate 1410 and can engage axial ramp surface (not shown) on the main body 1410. The ramp surfaces provide a ratchet-like torque limiting feature that allows slippage by the surfaces riding on each other. In some embodiments, the ramps provide so that a total movement can be minimized to a pre-determined rotation of 5 to 20 degrees. It will be appreciated that this predetermined rotation is merely exemplary as other settings on the amount of rotation may be employed. In some cases, the setting can be any fixed range below 1 full turn, or usually less than about 90 degrees. Such a configuration can also be desirable, for example, when seal compression lock and thread forces are present in a filter apparatus. A ratcheting configuration as shown can ensure that free rotation can occur to prevent over tightening.

Figure 30:
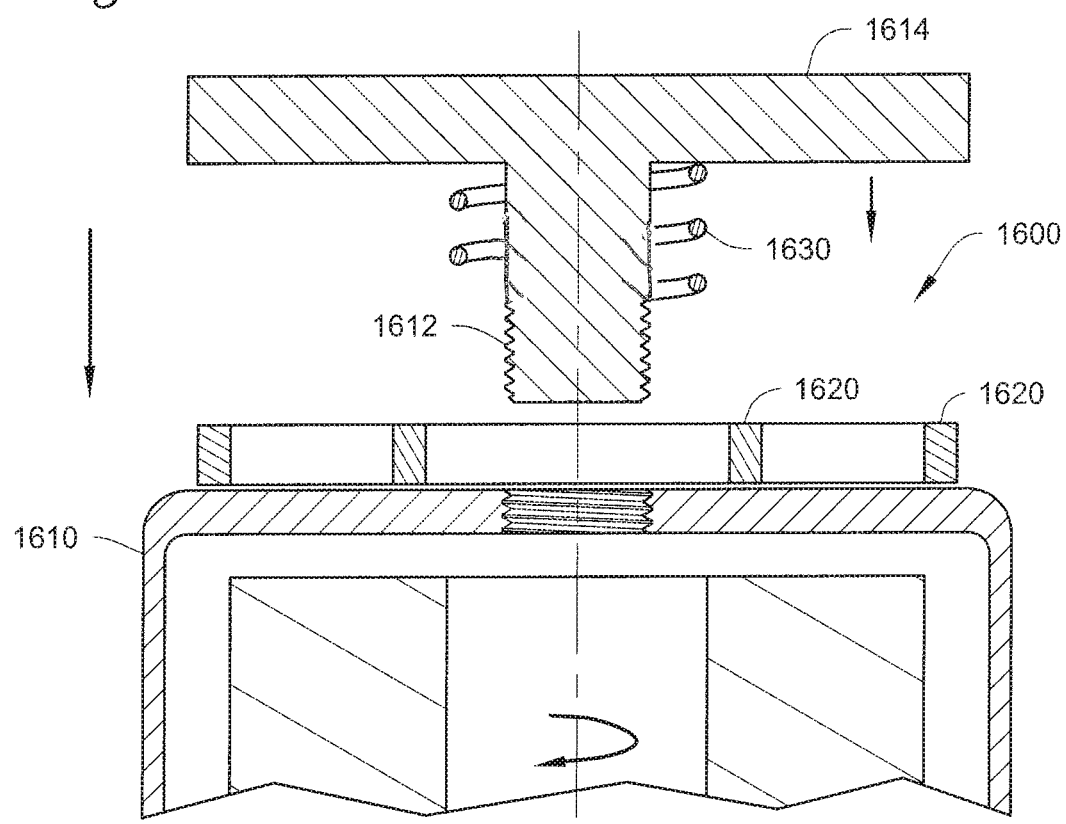
FIG. 30 is side sectional view of another embodiment of a filter apparatus with a torque limiting mechanism.
Figure 31:
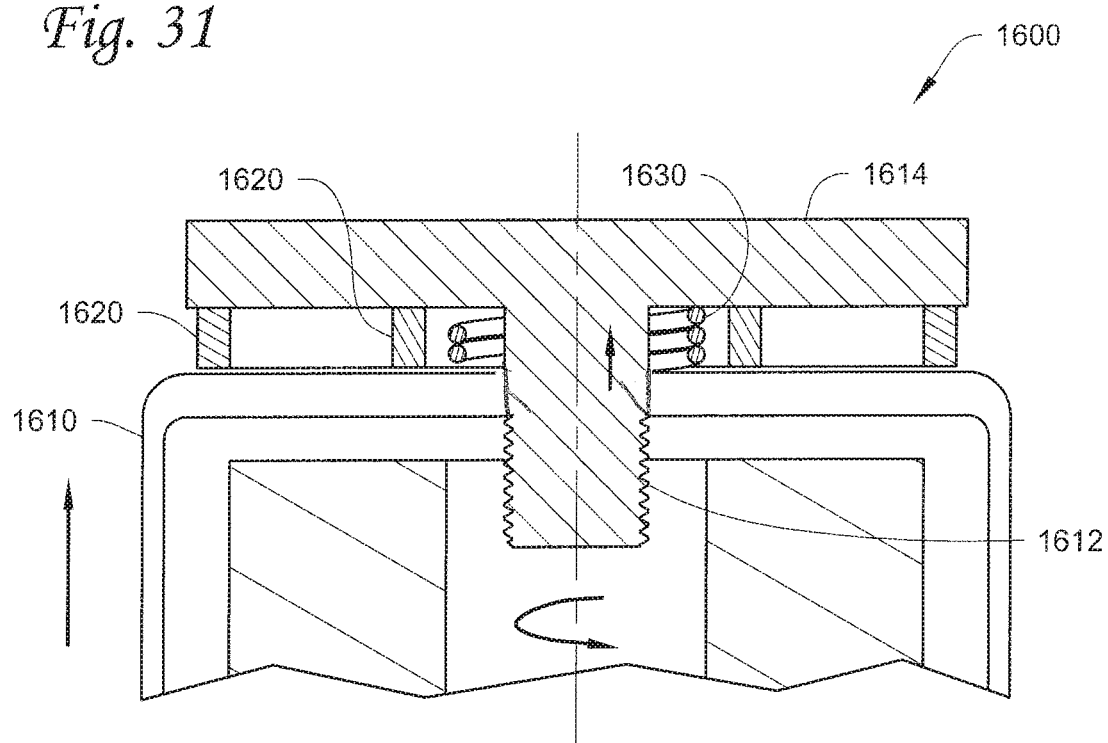
FIG. 31 is a side sectional view of the filter apparatus of FIG. 30.
Figure 32:
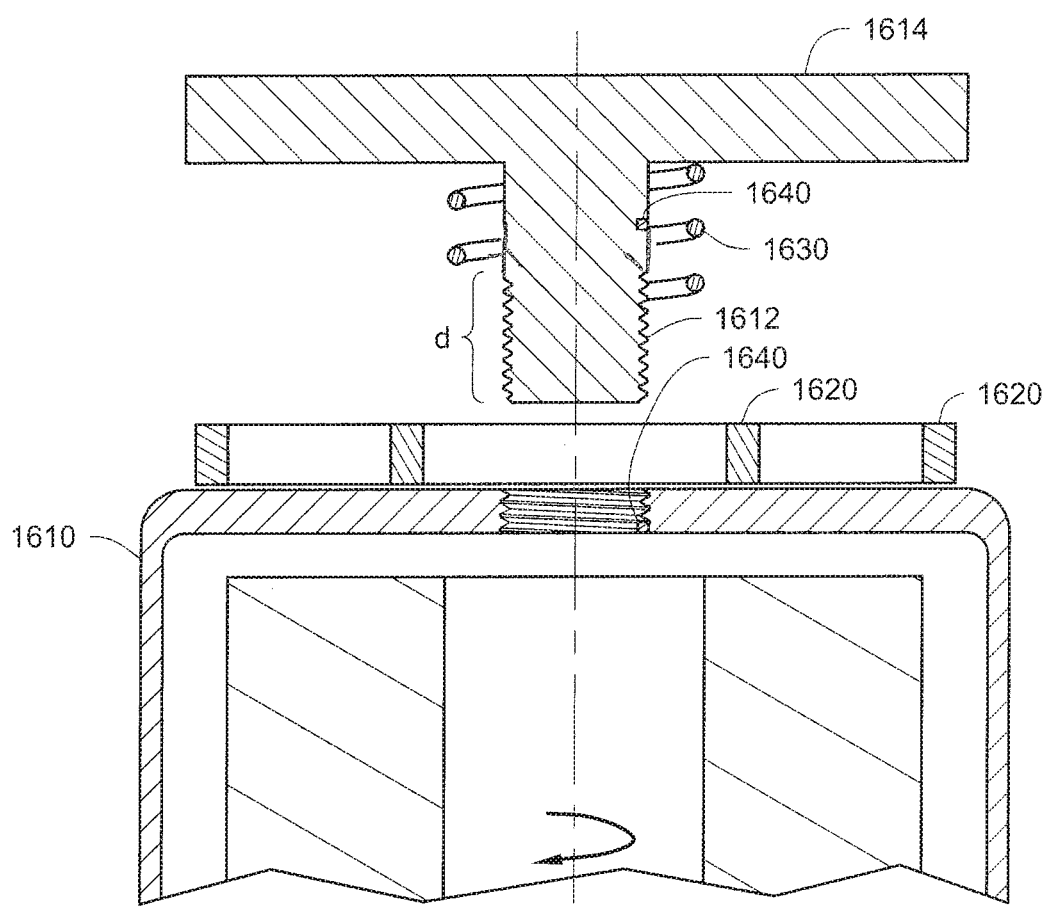
FIG. 32 is a side sectional view of the filter apparatus of FIG. 30.

FIGS. 30-32 show another embodiment of a filter apparatus 1600 with a torque limiting mechanism. The torque limiting mechanism can reside in a filter head structure that is connectable to a fluid filter. As shown, the filter apparatus 1600 has a filter head side that is connectable to a fluid filter 1610. In the example shown, a plate 1614 has a spud 1612 which can threadedly engage the fluid filter 1610. Seals 1620 seal the fluid filter 1610 to the filter head, e.g. plate 1614. The torque limiting mechanism includes a spring 1630 between the threaded portion of the spud 1612 and the plate 1614 Once the fluid filter 1610 passes the threaded portion of the spud 1612, it may freely spin relative to the filter head and spud 1612 (see e.g. FIG. 31). That is, a partially threaded spud 1612 (see "d" in FIG. 32) creates a spud portion that does not include thread, so that once the threads of the fluid filter 1610 clear the threads on the spud 1612, no over tightening or torqueing occurs. As shown, the threads disengage at a certain point on the spud creating the slippage, free rotation.

In some embodiments, a locking device 1640 may be included with the torque limiting mechanism. With reference to the example of FIG. 32, the thread locking device 1640 is located on the non-threaded portion of the spud 1612, and between the threaded portion and plate 1614.

Figure 33:
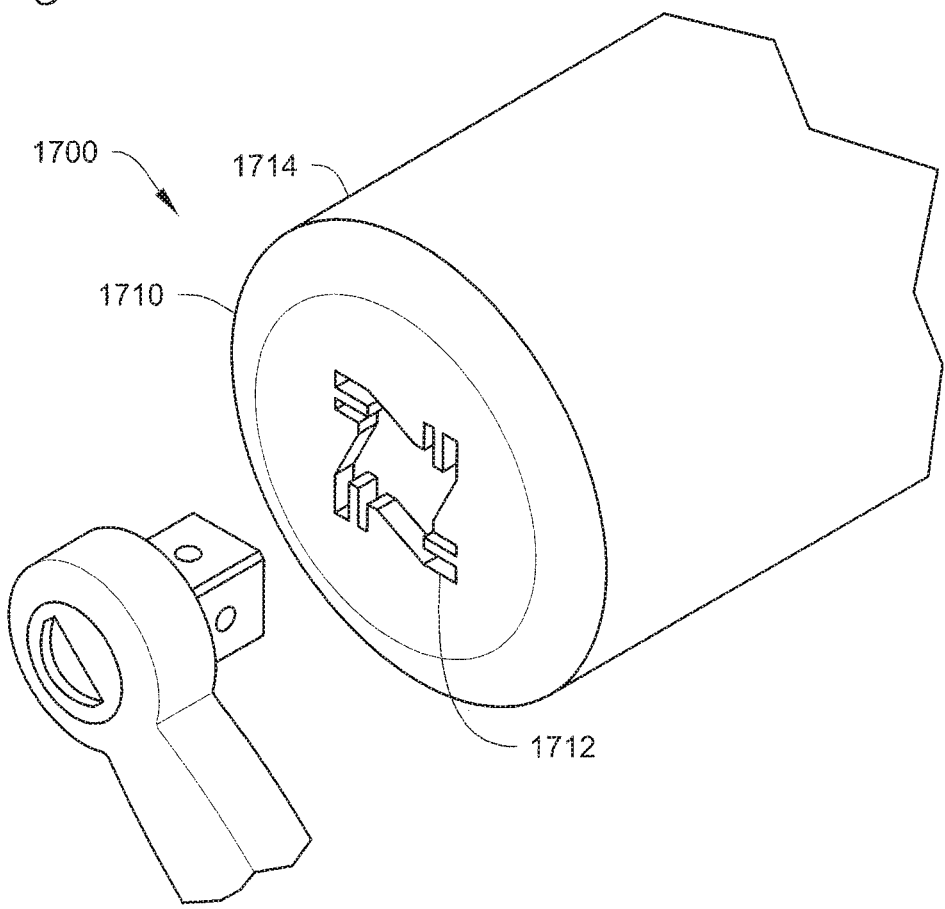
FIG. 33 is a perspective view of another embodiment of torque limiting device which may be employed in a filter apparatus.
Figure 34:
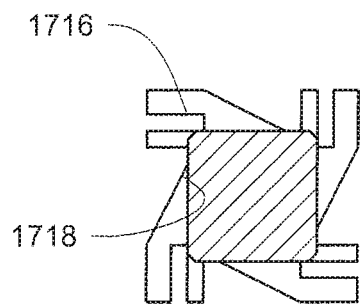
FIG. 34 shows the torque limiting device of FIG. 33.

FIGS. 33-36 show other embodiments of a filter apparatus 1700 with a torque limiting mechanism. The torque limiting mechanism can reside on a fluid filter, for instance on the bottom of a housing, such as for example on a drive area. As shown, fluid filter 1710 has a housing 1714, where the bottom part has a drive area. The drive area has the torque limiting mechanism 1712 constructed around the drive socket. As shown, the torque limiting mechanism 1712 has break away ribs 1716. In a tightening direction, the ribs are configured to break off at a certain torque, which will limit over tightening. It will be appreciated that the ribs 1716 may not necessarily need to break off, but may also deform or deflect out of the way, similar to for example a cantilever beam, after a predetermined torque is reached or passed. Blocks 1718 allow a tool such as a socket wrench to loosen the fluid filter 1710 from its connection with a filter head. The blocks 1718 can be pushed by the tool in the loosening direction. See e.g. FIG. 34. FIGS. 33 and 34 show a ribs ratchet configuration for inserting a drive and rotating the fluid filter until appropriate torque is reached.

Figure 35:
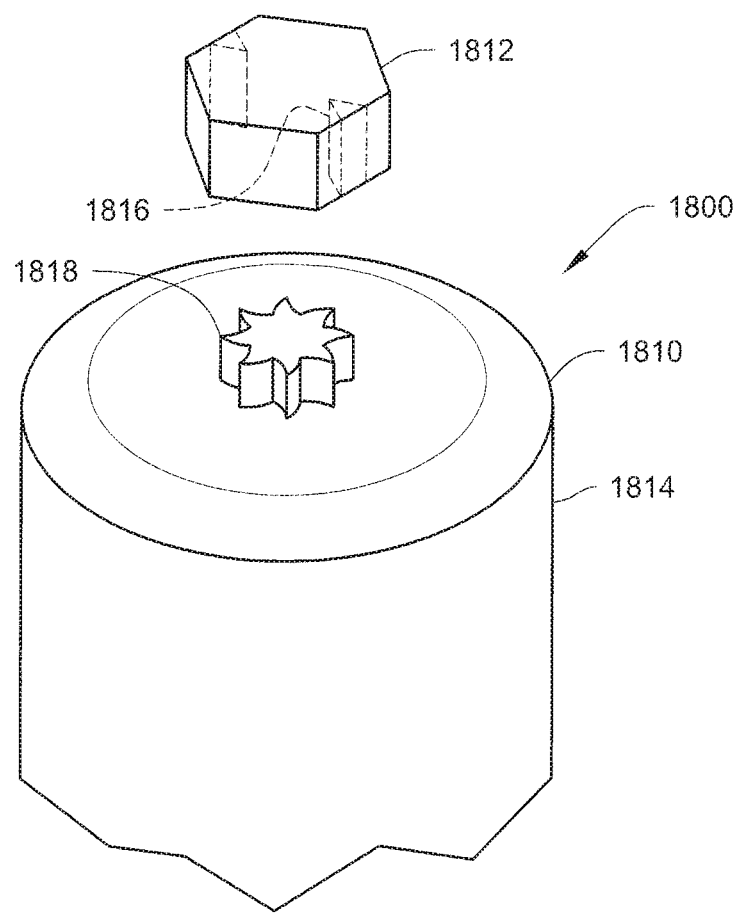
FIG. 35 is a perspective view of another embodiment of a torque limiting device which may be employed in a filter apparatus.

FIG. 35 shows another embodiment of a filter apparatus 1800 with a torque limiting mechanism. The torque limiting mechanism can reside on a fluid filter, for instance on the bottom of a housing, such as for example on a drive area. As shown, fluid filter 1810 has a housing 1814, where the bottom part has a drive area. The drive area has the torque limiting mechanism 1812 constructed as part of the drive socket. As shown, the torque limiting mechanism 1812 is a one-way ratcheting nut that only allows filter removal using a drive on the nut. The ratcheting or slippage is provided by ramps 1816 within the nut and ramps 1818 on the housing 1814. In some embodiments, the nut 1812 can be constructed to snap on the housing 1814, and the ramps provide the torque limiting effect once a certain torque has been reached.

Figure 36:
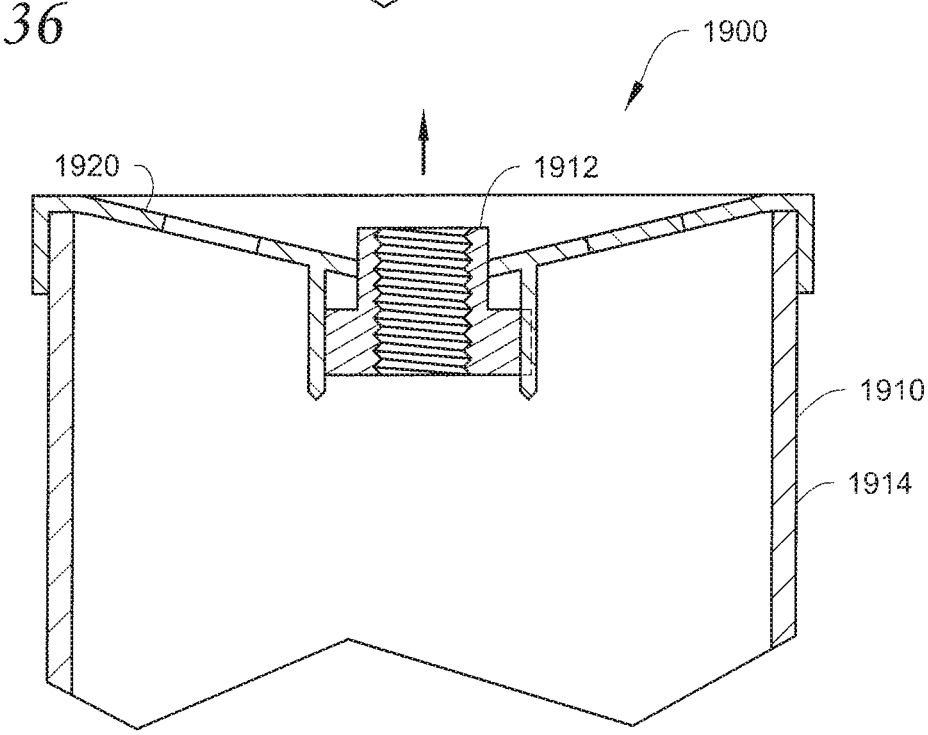
FIG. 36 is a perspective view of another embodiment of a torque limiting device which may be employed in a filter apparatus.

FIG. 36 shows another embodiment of a filter apparatus 1900 with a torque limiting mechanism. The torque limiting mechanism can reside on a fluid filter, for instance on a nutplate. As shown, fluid filter 1910 has a housing 1914, where a nutplate 1920 includes the torque limiting mechanism 1912. As shown, the torque limiting mechanism 1912 is constructed of a floating threaded metal piece that is configured to slide up and snap into place. In one embodiment, the threaded center rotates independent of the housing 1914 and will produce a click or ratchet to provide the torque limiting effect once a certain torque has been reached. For example, the torque limiting mechanism 1912 includes the floating threaded metal piece which may be a nut that has outer surfaces that can contact with side posts of the nutplate, which are shown on two sides of the floating metal piece of 1912. When the threaded center rotates independent of the housing 1914 it can produce a click or ratchet with the side posts to provide the torque limiting effect once a certain torque has been reached. This design is reflective of the idea that any of the torque limiting designs described can be integrated within the filter itself as opposed to only the block and head assembly. Thus, it will be appreciated that any combination or derivative of the previously proposed concepts are applicable.

FIGS. 37-40 show another embodiment of torque limiting device which may be incorporated in a filter apparatus, such as for example a fluid filter 2000. The torque limiting device is disposed on a spud 2014 included on the fluid filter 2000 and on a center tube 2020 of the fluid filter. In the embodiment shown, the torque limiting device includes a clutch mechanism with radial ramp elements that operate for example similar to those described in FIGS. 8 and 9.

As shown, the clutch mechanism resides on or proximate the spud 2014 of the fluid filter 2000 and on the center tube 2020. In the embodiment shown, for example in FIG. 39, the fluid filter 2000 has a clutch mechanism with radial ramps 2016, 2018 (best shown for example in FIG. 40) that ride on each other to allow slippage in the tightening direction, but not in the loosening direction, e.g. one way ratcheting. The clutch mechanism is located at the spud 2014 of the fluid filter 2000 and on the center tube 2020. In the embodiment shown, the ramps 2016 on the spud 2014 can engage the ramps 2018 on the center tube 2020 to provide torque limiting.

In some embodiments, the center tube 2020 can be an integral part of the nutplate 2010. The nutplate 2010 may be separately attached to the shell 2012, having filter media therein, of the fluid filter 2000 (see e.g. FIG. 39).

In some embodiments, the spud 2014 may be attached to the nutplate 2010 as a separate piece and can be removed from the nutplate 2010. The nutplate 2010 in the embodiment shown may also have retaining members 2024 that can connect to and retain the spud 2014 to the nutplate 2010, but also allow for the spud to rotate relative to the nutplate 2010 as suitable for the interaction of the radial ramps 2016, 2018. As shown, the retaining members 2024 can be catch or barb like structures that allow for example the spud 2014 to snap onto the nutplate 2010. It will be appreciated that the retaining members 2024 are not meant to be limited to the specific structure shown, as other suitable structures may be employed.

FIGS. 41-45 show another embodiment of torque limiting device which may be incorporated in a filter apparatus 2100. The torque limiting device is disposed on a spud 2114 included on the fluid filter 2100 and on a center tube 2120 of the fluid filter. In the embodiment shown, the torque limiting device includes a clutch mechanism with radial ramp elements that operate for example similar to those described in FIGS. 37-40. A difference is that the spud 2114 and center tube 2120 are disposed inside the fluid filter 2100 behind the nutplate 2110 and inside the filter shell 2112.

As shown, the clutch mechanism resides on or proximate the spud 2114 of the fluid filter 2100 and on the center tube 2120. In the embodiment shown, for example in FIGS. 43 and 44, the fluid filter 2100 has a clutch mechanism with radial ramps 2116, 2118 (best shown for example in FIG. 45) that ride on each other to allow slippage in the tightening direction, but not in the loosening direction, e.g. one way ratcheting. The clutch mechanism is located at the spud 2114 of the fluid filter 2100 and on the center tube 2120. In the embodiment shown, the ramps 2116 on the spud 2114 can engage the ramps 2118 on the center tube 2120 to provide torque limiting. In the embodiment shown, the spud 2114 has the radial ramps 2116 on an outer surface of an annular flange of the spud 2114 (see e.g. FIGS. 41 and 45), and the center tube 2120 has radial ramps 2118 on an inner surface of an annular flange of the center tube 2120 (see e.g. FIGS. 41 and 45). In such a configuration, the clutch mechanism can reside inside the fluid filter 2100 so as to minimize the profile of the fluid filter 2100, using internal space of the fluid filter 2100 that may be available, and that can be used as a retrofit design on existing filtration systems. In the embodiment shown, for example, the spud 2114 is an internal threaded connection.

In some embodiments, the center tube 2120 can be an integral part of the nutplate 2110. The nutplate 2110 may be separately attached to the shell 2112, having filter media therein, of the fluid filter 2100 (see e.g. FIGS. 43 and 44). In one embodiment, an integral molded seal 2126, such as rubber may be employed (see FIG. 43), or an o-ring type seal 2128 may be employed to seal filtered fluid exiting the fluid filter 2100 from fluid that has yet to be filtered by the fluid filter 2100.

In some embodiments, the spud 2114 may be attached to the nutplate 2110 as a separate piece and can be removed from the nutplate 2110. The nutplate 2110 in the embodiment shown may also have retaining members 2124 that can connect to and retain the spud 2114 to the nutplate 2110, but also allow for the spud to rotate relative to the nutplate 2010 as suitable for the interaction of the radial ramps 2116, 2118. As shown, the retaining members 2124 can be catch or barb like structures that allow for example the spud 2114 to snap onto the nutplate 2110. It will be appreciated that the retaining members 2124 are not meant to be limited to the specific structure shown, as other suitable structures may be employed.

In the embodiment shown, the nutplate 2110 can have various structures integrated therein so as to provide a multi-function nutplate as a single piece component of the fluid filter 2100, including for example the clutch element radial ramps 2118, the retaining members 2124, as well as the inlet and outlet of fluid flow and appropriate sealing.

The torque limiting devices described herein, with or without a clutch mechanism, can provide a protective function for a filter, and can activate once a certain torque is reached. A clutch mechanism as described herein can protect a filter from being over tightened and thereby prevent damage to filter components, and can also eliminate or reduce the need for torque measurement of certain filter components. It will be appreciated that the filter apparatus described herein can be useful in various filtration applications, including for example filters that are used in liquid filtration, such as lubrication, fuel and diesel exhaust fluid filtration, as well as filtration applications that do not employ liquid filters, such as filters for crankcase ventilation, and air. It will be appreciated that the filter apparatus herein may be useful in filtration applications other than those just mentioned, and where there may be a general need to prevent over tightening of filter component(s). It also will be appreciated that appropriate seal configurations can be implemented so that dirty and clean areas of the filtration system remain separate so that general leakage can be avoided.

The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A filter apparatus comprising:
    a fluid filter, the fluid filter includes a spud engageable with a filter head and a center tube; and
    a torque limiting device disposed on the spud and on the center tube of the fluid filter, and
    the torque limiting device includes an element that limits tightening of the fluid filter at the spud.

2. The filter apparatus of claim 1, wherein the torque limiting device includes a clutch mechanism, the clutch mechanism configured to provide one way ratcheting that allows slippage in a tightening direction to limit tightening of the fluid filter and that does not allow slippage in a loosening direction.

3. A filter apparatus comprising:
    a fluid filter, the fluid filter includes a connective portion engageable with a filter head; and
    a torque limiting device disposed on the fluid filter, and
    the torque limiting device includes an element that limits tightening of the fluid filter at the connective portion, wherein the torque limiting device includes a clutch mechanism, the clutch mechanism configured to provide one way ratcheting that allows slippage in a tightening direction to limit tightening of the fluid filter and that does not allow slippage in a loosening direction, wherein the clutch mechanism includes axial ramps on an under surface of a nutplate of the fluid filter, and axial ramps on an upper surface of an end of a shell of the fluid filter, the axial ramps of the nutplate cooperate with the axial ramps of the shell to provide the one way ratcheting.

4. A filter apparatus comprising:

a fluid filter, the fluid filter includes a connective portion engageable with a filter head; and a torque limiting device disposed on the fluid filter, and the torque limiting device includes an element that limits tightening of the fluid filter at the connective portion, wherein the torque limiting device includes a clutch mechanism, the clutch mechanism configured to provide one way ratcheting that allows slippage in a tightening direction to limit tightening of the fluid filter and that does not allow slippage in a loosening direction wherein the clutch mechanism includes radial ramps on a radial surface of a center tube connected to a nutplate of the fluid filter, and radial ramps on a radial surface of a spud of the fluid filter, the radial ramps of the center tube cooperate with the radial ramps of the spud to provide the one way ratcheting.

5. The filter apparatus of claim 4, wherein the radial surface of the spud is an inner radial surface, and wherein the radial surface of the center tube is an outer radial surface.

6. The filter apparatus of claim 4, wherein the radial ramps of the spud and the radial ramps of the center tube are disposed within an internal space of a shell of the fluid filter.

7. The filter apparatus of claim 6, wherein the radial ramps of the center tube are disposed on an inner surface of an annular flange of the center tube.

8. The filter apparatus of claim 4, wherein the nutplate comprises retaining members to retain the spud to the nutplate, and to allow the spud to rotate relative to the nutplate.

9. The filter apparatus of claim 8, wherein the retaining members are barbs structured to snap the spud onto the nutplate.

10. A filter apparatus comprising:

a fluid filter, the fluid filter includes a connective portion engageable with a filter head: and a torque limiting device disposed on the fluid filter, and the torque limiting device includes an element that limits tightening of the fluid filter at the connective portion, wherein the torque limiting device includes a clutch mechanism, the clutch mechanism configured to provide one way ratcheting that allows slippage in a tightening direction to limit tightening of the fluid filter and that does not allow slippage in a loosening direction, wherein the clutch mechanism includes axial ramps on an under surface of a nutplate connected to the fluid filter, and axial ramps on a an upper surface of an annular flange on a spud of the fluid filter, the axial ramps of the nutplate cooperate with the axial ramps of the annular flange of the spud to provide the one way ratcheting.

11. A filter apparatus comprising:

a fluid filter, the fluid filter includes a connective portion engageable with a filter head: and a torque limiting device disposed on the fluid filter, and the torque limiting device includes an element that limits tightening of the fluid filter at the connective portion, wherein the torque limiting device comprises a connective portion that is rotatable relative to a nutplate of the fluid filter, the connective portion has outer surfaces that are contactable with side posts of the nutplate to provide the one way ratcheting.

12. A filter apparatus comprising:

a fluid filter, the fluid filter includes a connective portion engageable with a filter head: and a torque limiting device disposed on the fluid filter, and the torque limiting device includes an element that limits tightening of the fluid filter at the connective portion, wherein the torque limiting device includes a clutch mechanism, the clutch mechanism configured to provide one way ratcheting that allows slippage in a tightening direction to limit tightening of the fluid filter and that does not allow slippage in a loosening direction, wherein the clutch mechanism includes radial ramps on an outer surface of a nutplate of the fluid filter and radial ramps on an inner surface of a shell of the fluid filter, the radial ramps of the nutplate cooperate with the radial ramps of the shell to provide the one way ratcheting.

13. An apparatus comprising:

a fluid filter, the fluid filter includes a connective portion engageable with a filter head: and a torque limiting device disposed on the fluid filter, and the torque limiting device includes an element that limits tightening of the fluid filter at the connective portion, wherein the torque limiting mechanism comprises a spring press fitted between a bore and a spud of the filter head, the spring is wound onto the spud and the spud is rotatable relative to a main body of the filter head, such that in a tightening direction an outer diameter of the spring reduces to relieve the press fit and the spud rotates relative to the main body of filter head to allow the spud to rotate relative to the main body, and in a loosening direction the outer diameter of the spring expands to press fit the spring between the bore and spud to not allow rotation of the spud relative to the main body.

14. The apparatus of claim 13, further comprising an engagement member movable along the spud to engage the spring.

* * * * *